United States Patent
Kim et al.

(10) Patent No.: US 11,678,284 B2
(45) Date of Patent: Jun. 13, 2023

(54) RADIO COMMUNICATION METHOD FOR TIME-SENSITIVE NETWORK, AND APPARATUS THEREFOR

(71) Applicant: ELECTRONICS AND TELECOMMUNICATIONS RESEARCH INSTITUTE, Daejeon (KR)

(72) Inventors: Cheul Soon Kim, Daejeon (KR); Jae Heung Kim, Sejong-si (KR); Sung Hyun Moon, Daejeon (KR); Jung Hoon Lee, Daejeon (KR); Sung Cheol Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 78 days.

(21) Appl. No.: 17/232,344

(22) Filed: Apr. 16, 2021

(65) Prior Publication Data

US 2021/0329580 A1 Oct. 21, 2021

(30) Foreign Application Priority Data

| Apr. 17, 2020 | (KR) | ........................ | 10-2020-0046744 |
| Jan. 18, 2021 | (KR) | ........................ | 10-2021-0007103 |
| Mar. 4, 2021  | (KR) | ........................ | 10-2021-0029092 |
| Apr. 9, 2021  | (KR) | ........................ | 10-2021-0046223 |

(51) Int. Cl.
*H04W 56/00* (2009.01)
*H04W 80/02* (2009.01)
*H04W 72/0446* (2023.01)
*H04W 72/23* (2023.01)

(52) U.S. Cl.
CPC ..... *H04W 56/0015* (2013.01); *H04W 56/005* (2013.01); *H04W 56/009* (2013.01); *H04W 72/0446* (2013.01); *H04W 72/23* (2023.01); *H04W 80/02* (2013.01)

(58) Field of Classification Search
CPC .......... H04W 72/042; H04W 56/0015; H04W 56/009; H04W 72/0446; H04W 56/005; H04W 80/02; H04W 56/00; H04W 72/04
USPC ........................................................ 370/503
See application file for complete search history.

(56) References Cited

U.S. PATENT DOCUMENTS

| 7,394,802 | B2 * | 7/2008 | Jun ....................... H04J 3/0661 |
| | | | 370/503 |
| 8,964,793 | B2 | 2/2015 | Jang et al. |
| 9,712,308 | B2 | 7/2017 | Ko et al. |
| 10,104,627 | B2 * | 10/2018 | Choi ................ H04L 27/26025 |
| 10,638,442 | B2 | 4/2020 | Kim et al. |
| 11,153,838 | B1 * | 10/2021 | Thota ................ H04W 56/0015 |
| 11,310,754 | B2 * | 4/2022 | Kim ................ H04W 56/0015 |
| 11,419,084 | B1 * | 8/2022 | Aijaz ................ H04W 56/004 |

(Continued)

*Primary Examiner* — Man U Phan
(74) *Attorney, Agent, or Firm* — Rabin & Berdo, P.C.

(57) ABSTRACT

An operation method of a first terminal, for synchronized operations according to time-sensitive networking, may comprise: receiving information on a reference time from a base station; obtaining an offset of the first terminal with respect to the reference time or information for deriving the offset, and deriving the offset from the information for deriving the offset; determining a timing at which uplink transmission is performed by reflecting the offset to the reference time; and performing the uplink transmission at the determined timing.

16 Claims, 18 Drawing Sheets

UE group 1 for synchronized operations

UE group 2 for synchronized operations

(56) References Cited

U.S. PATENT DOCUMENTS

| | | | |
|---|---|---|---|
| 2015/0103818 A1* | 4/2015 | Kuhn | H04W 56/00 |
| | | | 370/350 |
| 2018/0295616 A1 | 10/2018 | Yang et al. | |
| 2019/0222402 A1 | 7/2019 | Yang et al. | |
| 2020/0053593 A1 | 2/2020 | Baek et al. | |
| 2020/0153500 A1 | 5/2020 | Kim et al. | |
| 2020/0205108 A1* | 6/2020 | Alasti | H04W 74/0833 |
| 2020/0259896 A1* | 8/2020 | Sachs | H04L 67/10 |
| 2021/0306910 A1* | 9/2021 | Guo | H04W 72/54 |
| 2021/0314889 A1* | 10/2021 | Rico Alvarino | H04W 74/0833 |
| 2021/0400610 A1* | 12/2021 | Aijaz | H04L 7/0012 |
| 2022/0124654 A1* | 4/2022 | Takeda | H04W 56/00 |
| 2022/0174631 A1* | 6/2022 | Xiong | H04J 3/12 |

* cited by examiner

FIG. 15

| Index/bits | TAG ID | TA unit |
|---|---|---|
| 0/00 | 0 | Unit 1 |
| 1/01 | 1 | Unit 1 |
| 2/10 | 1 | Unit 2 |
| 3/11 | 2 | Unit 2 |

RADIO COMMUNICATION METHOD FOR TIME-SENSITIVE NETWORK, AND APPARATUS THEREFOR

CROSS-REFERENCE TO RELATED APPLICATIONS

This application claims priority to Korean Patent Applications No. 10-2020-0046744 filed on Apr. 17, 2020, No. 10-2021-0007103 filed on Jan. 18, 2021, No. 10-2021-0029092 filed on Mar. 4, 2021, and No. 10-2021-0046223 filed on Apr. 9, 2021 with the Korean Intellectual Property Office (KIPO), the entire contents of which are hereby incorporated by reference.

BACKGROUND

1. Technical Field

The present disclosure relates to a radio communication method and a radio communication apparatus, and more specifically, to a radio communication method for performing time-sensitive networking, and an apparatus therefor.

2. Related Art

In a time-sensitive network, a plurality of terminals may perform synchronized operations. For example, there may be a case in which a plurality of robots perform operations according to a predetermined sequence or perform predetermined operations at the same time. These operations may be managed by control units of the respective robots (i.e., terminals), and it is preferable that the control units of the terminals share a common time.

Each terminal may have its own clock, but the clock that the terminal has may not be accurate. In this case, an error in the operations may occur while terminals belonging to the same group perform synchronized operations according to different times. Accordingly, at least terminals belonging to the same group need to share a time from a reference clock. Information on the shared time may be received by each terminal in form of a message. Since the shared time may cause an error as much as a propagation delay, it is preferable that the terminal can estimate a correct time by compensating for this.

SUMMARY

Accordingly, exemplary embodiments of the present disclosure are directed to providing an operation method of a terminal for synchronized operations according to time-sensitive networking.

Accordingly, exemplary embodiments of the present disclosure are further directed to providing an operation method of a base station for synchronized operations according to time-sensitive networking.

Accordingly, exemplary embodiments of the present disclosure are further directed to providing a configuration of a terminal or base station for synchronized operations according to time-sensitive networking.

According to a first exemplary embodiment of the present disclosure, an operation method of a first terminal for synchronized operations according to time-sensitive networking may comprise: receiving information on a reference time from a base station; obtaining an offset of the first terminal with respect to the reference time or information for deriving the offset, and deriving the offset from the information for deriving the offset; determining a timing at which uplink transmission is performed by reflecting the offset to the reference time; and performing the uplink transmission at the determined timing.

The reference time may be generated by a global reference clock of the base station and received from the base station, or may be generated by a global reference clock of a second terminal other than the first terminal and received from the second terminal through the base station.

The reference time may be commonly applied to a terminal group including the first terminal and the second terminal.

The offset may be obtained through a scheme based on a timing advance (TA), or through a scheme based on a round-trip time (RTT) or a combination of an Rx–Tx time difference measured by the first terminal and an Rx–Tx time difference measured by the base station.

The TA may be defined by a difference between a boundary of a downlink slot received by the first terminal and a boundary of an uplink slot transmitted by the first terminal, the uplink slot having a same index as the downlink slot.

The RTT may be measured by the first terminal based on a downlink reference signal of the base station and an uplink reference signal of the first terminal, or measured by the base station and transmitted from the base station to the first terminal.

The downlink reference signal may be at least one of a downlink positioning reference signal (PRS), a synchronization signal (SS)/physical broadcast channel (PBCH) block, and a channel state information (CSI)-RS, and the uplink reference signal may be at least one of an uplink PRS and a sounding reference signal (SRS).

When the RTT is measured by the first terminal, RTT measurement using the downlink reference signal may be triggered by downlink control information (DCI), and the DCI may further include information indicating a resource of the downlink reference signal.

When the DCI allocates a downlink transport block (TB), the DCI may further indicate whether rate matching is applied or not, the rate matching being for mapping a physical downlink shared channel (PDSCH) to resource elements (RE) to which the downlink reference signal is not mapped.

The offset of the first terminal or the information for deriving the offset may be received from the base station through downlink control information (DCI) included in a terminal-specific physical downlink control channel (PDCCH) or a medium access control (MAC) random access response (RAR) or MAC control element (CE) included in a terminal group-specific PDSCH, or measured by the first terminal and reported to the base station through a terminal-specific uplink channel.

When the offset is obtained through a scheme based on a TA, the MAC RAR or the MAC CE may include an initial value of a TA or a timing advance command (TAC) that is a value accumulated in a current TA.

The MAC RAR or the MAC CE may include information on a unit time applied to the TA and/or the TAC.

According to a second exemplary embodiment of the present disclosure, an operation method of a base station for synchronized operations according to time-sensitive networking may comprise: providing information on a reference time generated by a global reference clock to a first terminal; obtaining an offset of the first terminal with respect to the reference time or information for deriving the offset, and providing the offset or the information for deriving the offset to the first terminal; and performing uplink reception for the first terminal, wherein the first terminal performs uplink transmission corresponding to the uplink reception at a timing determined by reflecting the offset to the reference time.

The reference time may be commonly applied to a terminal group including the first terminal and the second terminal.

The offset may be obtained through a scheme based on a timing advance (TA), or through a scheme based on a round-trip time (RTT) or a combination of an Rx–Tx time difference measured by the first terminal and an Rx–Tx time difference measured by the base station.

The RTT may be measured by the base station based on a downlink reference signal of the base station and an uplink reference signal of the first terminal, and transmitted from the base station to the first terminal.

The downlink reference signal may be at least one of a downlink positioning reference signal (PRS), a synchronization signal (SS)/physical broadcast channel (PBCH) block, and a channel state information (CSI)-RS, and the uplink reference signal may be at least one of an uplink PRS and a sounding reference signal (SRS).

The offset of the first terminal or the information for deriving the offset may be provided to the first terminal through downlink control information (DCI) included in a terminal-specific physical downlink control channel (PDCCH) or a medium access control (MAC) random access response (RAR) or MAC control element (CE) included in a terminal group-specific PDSCH.

When the offset is obtained through a scheme based on a TA, the MAC RAR or the MAC CE may include an initial value of a TA or a timing advance command (TAC) that is a value accumulated in a current TA.

The MAC RAR or the MAC CE may include information on a unit time applied to the TA and/or the TAC.

Using the exemplary embodiments of the present disclosure, it is made possible to acquire time synchronization necessary for a plurality of terminals to perform synchronized operations in a time-sensitive network. Accordingly, efficiency and reliability of a communication system based on the time-sensitive networking can be improved.

BRIEF DESCRIPTION OF DRAWINGS

Exemplary embodiments of the present disclosure will become more apparent by describing in detail embodiments of the present disclosure with reference to the accompanying drawings, in which:

FIG. 15 is a conceptual diagram illustrating a case of indexing combinations of a TAG ID and a TAC unit;

Figure 1:
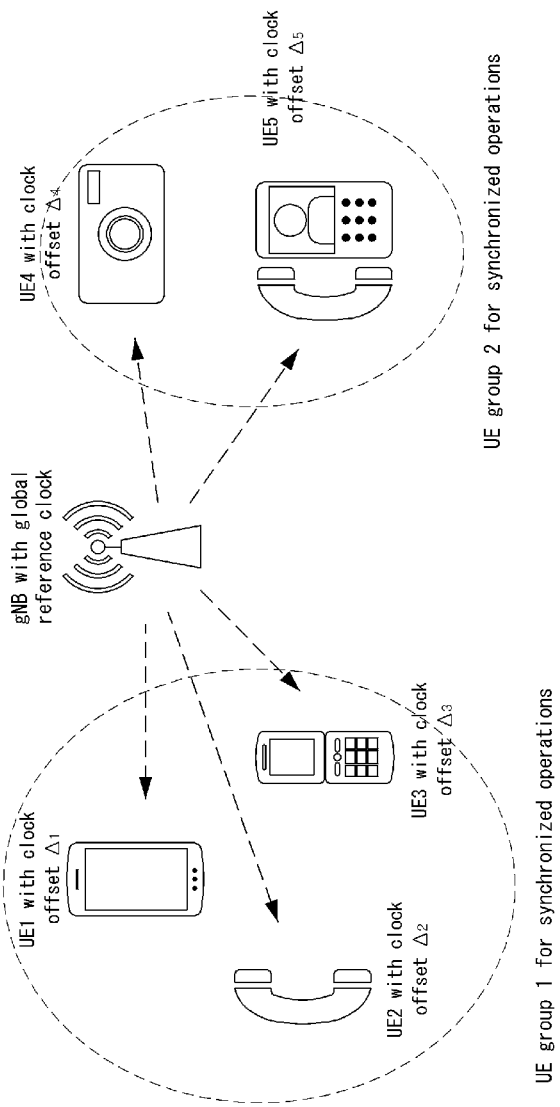
FIG. 1 is a conceptual diagram illustrating an example in which time-synchronized terminals perform synchronized operations in a time-sensitive network.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

In the following, a wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks.

Hereinafter, methods of providing information on a propagation delay in order to improve synchronization performance in a time-sensitive network are described.

(1) Methods of Forming a Time-Sensitive Networking Group

Hereinafter, a case in which a plurality of terminals perform synchronized operations in a time-sensitive network may be considered. For example, there may be a case in which a plurality of robots perform operations according to a predetermined sequence or perform predetermined operations at the same time. Such the operation may be managed by a control unit of each robot (i.e., terminal), and it is preferable that the control units of the terminals share a common time.

FIG. 1 is a conceptual diagram illustrating an example in which time-synchronized terminals perform synchronized operations in a time-sensitive network.

Referring to FIG. 1, a base station (e.g., gNB) having a global reference clock and terminals (i.e., UE1 to UE5) operating as synchronized with the global reference clock using offsets with respect to a time of the global reference clock are shown.

For example, in a power grid control network, some devices may perform operations based on wireless communication. In this case, the devices should be able to share a common time. The time synchronization that control units of the terminals or the devices of the power grid control network should have is required to have an error of less than 1 µs. An area in which such the time synchronization can be maintained may have variable limitations depending on the terminal or the power grid control network, and Table 1 summarizes these scenarios. Specifically, Table 1 summarizes the synchronization performance conditions in the time-sensitive network specified in the 3$^{rd}$ generation partnership project (3GPP) TS 22.104.

TABLE 1

| Scenario | Number of devices belonging to a group sharing time synchronization | Maximum tolerable error of time synchronization | Service area |
|---|---|---|---|
| Communication between control units of industrial robots | Equal to or less than 300 | Equal to or less than 1 µs | Equal to or less than 10000 m$^2$ |
| Video streaming | Equal to or less than 10 | Equal to or less than 10 µs | Equal to or less than 2500 m$^2$ |
| Communication between control units of a power grid control network | Equal to or less than 100 | Equal to or less than 1 µs | Equal to or less than 20 km$^2$ |

The terminals may form at least one group for synchronized operations. In FIG. 1, a case in which the terminals form two terminal groups (i.e., group 1 and group 2) is shown. In order to form the terminal groups, the base station may indicate a group identifier to each terminal supporting time-sensitive networking through higher layer signaling. The group identifier may be a radio network temporary identifier (RNTI).

Method 1-1: The Base Station May Inform the Terminal of a Group Identifier Through Higher Layer Signaling.

The terminals belonging to the same group may share the same time with each other. To this end, the terminals may receive time-related information from the base station. For example, the base station may transmit a physical downlink shared channel (PDSCH) including information on a coordinated universal time (UTC). Alternatively, the information may be included in system information and transmitted in a broadcast scheme. Alternatively, the information may be transmitted to some terminals in a multicast scheme or a unicast scheme.

Each terminal may have its own clock, but the clock that the terminal has may not be accurate. In this case, if the terminals belonging to the same group to perform the synchronized operations operate according to different clocks, an operation error may occur. Accordingly, at least the clocks of the terminals belonging to the same group need to be synchronized or at least the terminals belonging to the same group need to estimate a difference between their clocks.

Figure 2:
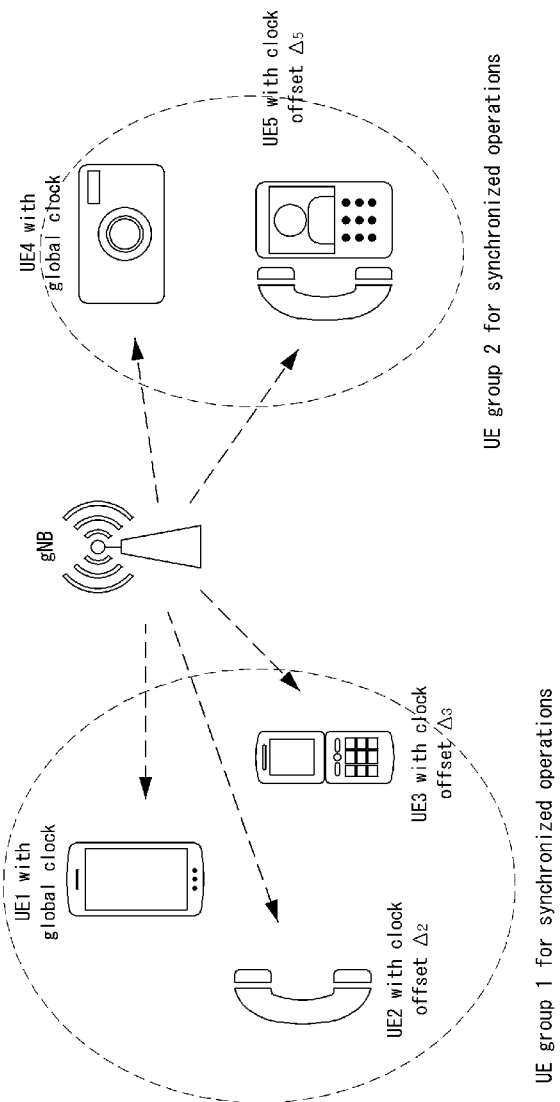
FIG. 2 is a conceptual diagram illustrating another example in which time-synchronized terminals perform synchronized operations in a time-sensitive network.

FIG. 2 is a conceptual diagram illustrating another example in which time-synchronized terminals perform synchronized operations in a time-sensitive network.

In the time-sensitive network shown in FIG. 1, only the base station (e.g., gNB) may have a global reference clock. On the other hand, referring to FIG. 2, specific terminals (e.g., UE1 and UE4) other than the base station may have reference clocks. The terminals may receive a time of the reference clock (i.e., reference time) through the base station. That is, UE2 and UE3 may receive the time of the reference clock of UE1 through the base station, and UE5 may receive the time of the reference clock of UE4 through the base station.

The devices (or terminals) belonging to a service area should maintain time synchronization within a predetermined error. When the size of the service area increases, a delay time (i.e., propagation delay) in a radio section should be considered. That is, even when the time of the reference clock is wirelessly shared, each of the devices (or terminals)

receiving the same reference clock should correct the shared time with its own delay time.

For example, for the shared reference time, each terminal i may be expressed as having an offset $\Delta_i$. Accordingly, each of the terminals belonging to the group 1 and the group 2 should compensate for the reference clock by using the offset to be applied to the terminal to perform an operation synchronized with other terminals belonging to the own group. Therefore, there is a need for a method that allows the terminal to know a value of $\Delta_i$.

For example, $\Delta_i$ may be obtained from a timing advance (TA) or a round-trip time (RTT) shared by the base station and the terminal i. In order for the terminal i to perform compensation based on $\Delta_i$, the base station may transmit a value of $\Delta_i$ or information for deriving $\Delta_i$ to the terminal i. The base station may transmit the information to the terminal i in a unicast scheme or a multicast scheme.

The terminal may estimate a propagation delay in a TA-based scheme or an RTT-based scheme, but the accuracy and protocol/signaling burdens of the schemes are different from each other. Specifically, the TA-based scheme has relatively low accuracy, but additional signaling is not required or minimized. On the other hand, the RTT-based scheme has relatively high accuracy, but requires additional signaling.

For example, in the scenario of Table 1, if the terminal i corresponds to a control unit of an industrial robot, it may be preferable to apply the RTT-based scheme because high accuracy is required. On the other hand, if the terminal i corresponds to a control unit of a power grid control network, since a somewhat low accuracy is required, it may be also possible to apply the TA-based scheme. In this case, it may be preferable that the base station indicates (or configures) through higher layer signaling so that the TA-based scheme or the RTT-based scheme is applied according to the scenario to which the terminal i and/or the terminal group belongs.

Method 1-2: The Terminal May be Indicated (or Configured) by the Base Station Through Radio Resource Control (RRC) Signaling to Apply the TA-Based Scheme or the RTT-Based Scheme, and May Estimate a Propagation Delay.

(i) TA-Based Scheme

The base station may transfer a TA to the terminal (i.e., terminal i) so that the terminal i estimates a propagation delay (or $\Delta_i$). The TA may be defined as a difference between downlink reception timing and uplink transmission timing. More specifically, the TA may be derived based on a difference between a boundary of a downlink slot received by the terminal and a boundary of an uplink slot transmitted by the terminal, which has the same slot index as the downlink slot received by the terminal. The TA may be a sum of a downlink propagation delay and an uplink propagation delay. In general, since the downlink propagation delay and the uplink propagation delay may be regarded as having a small difference, the downlink propagation delay and the uplink propagation delay may be interpreted as the same value. That is, the propagation delay may be calculated as a half of the estimated value of the TA.

(ii) RTT-Based Scheme

Meanwhile, the propagation delay (or, $\Delta_i$ or information for deriving $\Delta_i$) may be estimated using information other than the TA. A method for measuring a difference between a transmission timing and a reception timing by using a downlink reference signal (e.g., channel state information-reference signal (CSI-RS), synchronization signal (SS))/physical broadcast channel (PBCH) block, or downlink positioning reference signal (PRS)) received from the base station and an uplink reference signal transmitted by the terminal i may be applied. That is, this may be interpreted as a method of estimating a round trip delay (RTD).

For example, the terminal may receive a downlink reference signal from the base station. In addition, the terminal may transmit an uplink reference signal in response to the downlink reference signal, and the base station may receive it. By using a time difference between the transmission timing and the reception timing, a round-trip delay (RTD) of a link between the base station and the terminal may be identified.

Figure 3:
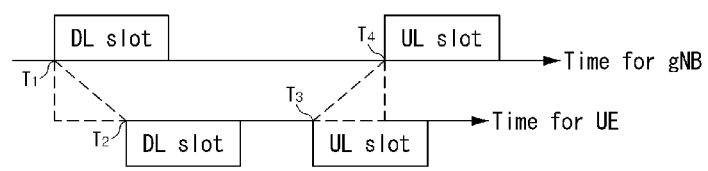
FIGS. 3 and 4 are conceptual diagrams for describing methods of measuring a round-trip delay (RTD) using an RTT-based scheme.
Figure 4:
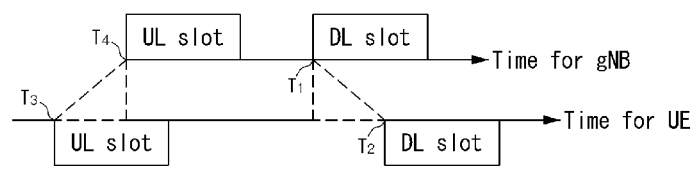

FIGS. 3 and 4 are conceptual diagrams for describing methods of measuring a round-trip delay (RTD) using an RTT-based scheme.

Specifically, FIG. 3 shows an exemplary embodiment in which the RTT is measured at the base station, and FIG. 4 shows an exemplary embodiment in which the RTT is measured at the terminal.

FIGS. 3 and 4 describe that transmission of an uplink signal or channel and reception of a downlink signal or channel have a predetermined time interval, but exemplary embodiments are not limited thereto. In general, since transmission of an uplink signal or channel and reception of a downlink signal or channel are performed independently, $T_1$ and $T_2$, and $T_3$ and $T_4$ are only timings obtained to derive a downlink delay time and an uplink delay time. They may not mean a prerequisite relationship or a causal relationship between the reception of a downlink signal or channel and the transmission of an uplink signal or channel.

Referring to FIGS. 3 and 4, a downlink signal or channel (e.g., DL PRS) is transmitted in a downlink slot, and an uplink signal or channel (e.g., UL PRS, SRS, or PRACH) is transmitted in an uplink slot. After a predetermined time elapses, the base station may start a downlink slot at $T_1$. The terminal may be operating based on a time different from that of the base station, and the terminal may consider that the downlink slot starts at $T_2$. The terminal i may regard a time when an uplink slot starts as $T_3$, and the base station may regard a time when the uplink slot starts as $T_4$.

Alternatively, the base station may transmit a downlink reference signal at $T_1$ (i.e., a first path of a first symbol of the downlink reference signal is transmitted at $T_1$). The terminal i may receive the downlink reference signal at $T_2$. After a predetermined time elapses, the terminal i may transmit an uplink reference signal at $T_3$. The base station may receive the uplink reference signal at $T_4$. For example, when the terminal i receives the downlink reference signal and derives a first time resource for transmitting the uplink reference signal, the corresponding time resource may be given as $T_3$. A difference between $T_3$ and $T_2$ may be indicated to the terminal by higher layer signaling from the base station, and the base station may receive the uplink reference signal at $T_4$.

As shown in FIG. 3, a downlink propagation delay may be calculated as $(T_2-T_1)$, and an uplink propagation delay may be calculated as $(T_4-T_3)$. The RTD may be given as a sum of these, and may be expressed as $RTD=(T_2-T_1)+(T_4-T_3)=(T_4-T_1)-(T_3-T_2)$. That is, the RTD may be given as a difference between an amount $(T_4-T_1)$ representing a difference between the transmission timing and the reception timing at the base station and an amount $(T_3-T_2)$ representing a difference between the transmission timing and the reception timing at the terminal.

On the other hand, in the case of FIG. 3, the RTT may be measured from the base station transmitting the downlink reference signal to the terminal, but in the case of FIG. 4, the RTT may be measured from the terminal i transmitting the uplink reference signal to the base station. The difference between the two cases may appear in a method of compensating for the propagation delay after measuring the RTT. That is, in the case of FIG. 4, the uplink propagation delay may be calculated as $(T_4-T_3)$, and the downlink propagation delay may be calculated as $(T_2-T_1)$. The RTD may be given as the sum of these. Since $RTD=(T_4-T_3)+(T_2-T_1)=(T_2-T_3)-(T_1-T_4)$, the RTD may be given as a difference between an amount $(T_2-T_3)$ representing a difference between the reception timing and the transmission timing at the terminal and an amount $(T_1-T_4)$ representing a difference between the transmission timing and the reception timing at the base station.

A transmit and receive time difference (i.e., Rx–Tx time difference or Tx–Rx time difference) (i.e., the difference between the reception (transmission) timing and the transmission (reception) timing at the terminal, or the difference between the transmission (reception) timing and the reception (transmission) timing at the base station) may be estimated by the base station or the terminal, and values estimated by the base station and the terminal may be defined differently. When a timing of the uplink slot received from the terminal is expressed as TRX and a timing of a downlink slot closest to the corresponding uplink slot among downlink slots transmitted to the terminal is expressed as TTX, a gNB Rx–Tx time difference may be defined as (TRX-TTX). When a timing of the downlink slot received from the base station is expressed as TRX and a timing of an uplink slot closest to the corresponding downlink slot among uplink slots transmitted to the base station is expressed as TTX, a UE Rx–Tx time difference may be defined as (TRX-TTX).

A device measuring an RTT and a device compensating for a propagation delay may be the same, but may be different. Four combinations of the device measuring the RTT and the device compensating for the propagation delay may be given.

The first combination is when the base station measures the RTT and compensates for the propagation delay. In this case, the terminal may perform an operation of receiving a downlink reference signal and transmitting an uplink reference signal. The Rx–Tx time difference measured by the terminal may be reported to the base station. Since the base station by an implementation compensates for the propagation delay in advance, the terminal does not need to additionally correct the clock.

The second combination is when the base station measures the RTT and the terminal compensates for the propagation delay. In this case, the terminal may perform reception of a downlink reference signal and transmission of an uplink reference signal, and receive the RTT or Rx–Tx time difference measured by the base station from the base station to correct the clock of the terminal. If the Rx–Tx time difference is received from the base station, the terminal may estimate the RTT in combination with the Rx–Tx time difference of the terminal.

The third combination is when the terminal measures the RTT and compensates for the propagation delay. In this case, the terminal may perform an operation of transmitting an uplink reference signal and receiving a downlink reference signal. The base station may indicate the measured RTT or Rx–Tx time difference to the terminal. If the Rx–Tx time difference is received from the base station, the terminal may estimate the RTT in combination with the Rx–Tx time difference of the terminal.

The fourth combination is when the terminal measures the RTT and the base station compensates for the propagation delay. In this case, the terminal may perform an operation of transmitting an uplink reference signal and receiving a downlink reference signal. The terminal may report the RTT or Rx–Tx time difference to the base station. Since the base station by implementation compensates for the propagation delay in advance, the terminal does not need to additionally correct the clock.

In order to compensate for the propagation delay in the terminal i, the transmit and receive time difference (i.e., Rx–Tx time difference or Tx–Rx time difference) should be transferred from the base station to the terminal. That is, the terminal i should know the value $(T_4-T_1, T_1, \text{ or } T_4)$ estimated by the base station. The base station may transfer the corresponding value itself or an index indicating the corresponding value to the terminal i. This may be used as information for deriving $\Delta_i$.

Conversely, in order for the base station to compensate for the propagation delay, the base station should know the value $(T_3-T_2, T_2, \text{ or } T_3)$ estimated by the terminal i. The terminal i should be able to report the value itself or an index (or offset) indicating the value to the base station.

In order to measure the RTT, the base station may indicate the terminal i to receive a downlink reference signal (or, downlink PRS, SS/PBCH block, or CSI-RS). In addition, the base station may indicate the terminal i to transmit an uplink reference signal (or, uplink PRS or sounding reference signal (SRS)). Hereinafter, a case in which the downlink PRS is used for RTT measurement will be described. However, in addition to the downlink PRS, various downlink reference signals may be used.

Method 1-3: The Base Station May Configure a Downlink PRS for Each Bandwidth Part (BWP) of the Terminal.

According to the conventional method, a downlink PRS may be transmitted from one or more base stations to a terminal for the purpose of measuring a position of the terminal. Therefore, the downlink PRS may be configured irrespective of a BWP configured in the terminal. The terminal may perform downlink BWP switching in order to receive the downlink PRS. This may cause a delay time. Therefore, in the case of using the downlink PRS for the purpose of estimating the RTT or Rx–Tx time difference, it may be preferable that the downlink PRS is configured in the downlink BWP configured for the terminal so that the terminal can receive the downlink PRS without spending an additional time for BWP switching.

Method 1-4: The Base Station May Indicate RTT Measurement Using a Downlink PRS and/or a Downlink Reference Signal to the Terminal, and the Triggering May be Performed Using at Least Scheduling DCI.

According to the conventional method, since the downlink PRS is periodically received, the terminal may receive the downlink PRS only in a predetermined slot and measure the RTT. However, in order to measure the RTT or Rx–Tx time difference, the downlink PRS and the uplink reference signal may be simultaneously considered, and the measurement of the RTT using the downlink PRS and the uplink reference signal should be able to be triggered by DCI.

When the RTT measurement is indicated by a scheduling DCI, if the scheduling DCI is a DCI that schedules downlink transmission (i.e., DL-DCI), a PDSCH may be mapped only to resource elements (REs) to which the downlink PRS is not mapped. In this case, the terminal may perform mapping of the PDSCH through rate matching or puncturing. This is embodied in Method 1-5, which will be described later.

A field of the scheduling DCI may represent a downlink reference signal resource index (e.g., downlink PRS resource index or CSI-RS resource index). The terminal may be indicated several downlink RS resources through RRC signaling, and may assume that one or more DL RS resource(s) among them are indicated for measuring the RTT or Rx-Tx time difference measurement based on the field of the DL-DCI.

Meanwhile, when an SS/PBCH block(s) is used for RTT measurement (or Rx-Tx time difference measurement) instead of the downlink RS, the triggering of RTT measurement using the downlink RS described above may not be considered.

Method 1-5: In Method 1-4, an Additional Field May be Introduced in the DL-DCI to Indicate Whether to Trigger RTT or Rx-Tx Time Difference Measurement Using the Downlink RS and/or Whether to Apply Rate Matching for the PDSCH.

The terminal i may have to report the transmit and receive time difference value to the base station. In this case, the base station may indicate the terminal to measure the transmit and receive time difference (i.e., information for deriving $\Delta_i$) and report it on a PUSCH by using DCI scheduling uplink transmission (i.e., UL-DCI). The transmit and receive time difference value should be able to be reported by dynamic allocation of the base station rather than being periodically transmitted by the terminal. When the measured transmit and receive time difference is transmitted as included in a higher layer message, the base station may allocate a resource of the PUSCH in which the higher layer message is to be transmitted to the terminal i by using UL-DCI.

Method 1-6: In Method 1-4, an Additional Field May be Introduced in the UL-DCI to Trigger RTT or Rx-Tx Time Difference Measurement Using the Downlink RS or to Indicate Whether to Report Information for Deriving $\Delta_i$.

In general, it may be preferable that transmission of a PUSCH including a higher layer message is indicated by a higher layer signaling. However, in the case of transmit and receive time difference, since the downlink RS is involved in the physical layer, it is preferable that the UL-DCI indicates whether to use the downlink RS for RTT or Rx-Tx time difference measurement or whether to report information for deriving $\Delta_i$. When a specific field of the UL-DCI received by the terminal i is used, a time resource of the downlink RS is given by the technical specification based on a slot in which the UL-DCI is received, and the resource for the PUSCH including the information for deriving $\Delta_i$ in the higher layer message may be indicated.

In addition, when the terminal i is configured with multiple downlink RS resources through RRC signaling, the field of the UL-DCI may include an index indicating one or more downlink RS resource(s), and the terminal may receive downlink RS(s) based on this index.

As an example, the terminal i may know that the terminal should receive a downlink RS and report information for deriving $\Delta_i$ based on the specific field of UL-DCI. The terminal i may expect to receive the downlink RS in a slot in which the UL-DCI is received (or, a slot to which a slot offset determined in the technical specification is applied), and may transmit the PUSCH in the resource indicated by the UL-DCI. The information for deriving $\Delta_i$ may be reported to the base station as included in the PUSCH.

According to another method, reporting of the information for deriving $\Delta_i$ may be performed periodically. To this end, the base station may indicate a periodicity and a slot offset for the reporting to the terminal i by RRC signaling. The terminal i may perform only periodic reporting. Alternatively, the terminal i may perform both periodic reporting and triggered reporting.

(2) Method of Using UE-Specific Downlink Channels

In case of unicast, the base station may use a downlink channel different from a downlink channel for a terminal j(i≠j) in order to transmit a value of $\Delta_i$ or information for deriving $\Delta_i$ to the terminal i. The base station may use a radio identifier of each terminal. The radio identifier may be a cell (C)-RNTI, a modulation and coding scheme (MCS)-C-RNTI, or a configured scheduling (CS)-RNTI.

The base station may apply the radio identifier of the terminal i when scrambling DCI to be transmitted to the terminal i. The value of $\Delta_i$ or the information for deriving $\Delta_i$ may be included in a DCI or a PDSCH.

(i) Method of Using a UE-Specific PDCCH

Method 2-1: A Specific Field of DCI May Include Information Transmitted to the Terminal i (i.e., the Value of $\Delta_i$ or the Information for Deriving $\Delta_i$).

The terminal i may confirm that the corresponding DCI is transmitted to the terminal i based on scrambling of the DCI. A specific field of the DCI may include the value of $\Delta_i$ or the information for deriving $\Delta_1$. The base station may indicate the length of the corresponding field and the position of the corresponding field in the DCI to the terminal through higher layer signaling. The terminal may identify the value of $\Delta_i$ or the information for deriving $\Delta_i$ from the corresponding field. Accordingly, the terminal may correct the reference time received from the base station. Meanwhile, the DCI may allocate a transport block (TB) to the terminal i, or may not allocate a TB to the terminal i.

Method 2-2: When the DCI Includes the Corresponding Information (i.e., Value of $\Delta_i$ or Information for Deriving $\Delta_i$), the Terminal May Transmit a Hybrid Automatic Repeat Request (HARQ)-Acknowledgement (ACK) for the Corresponding Information to the Base Station.

When the DCI does not allocate a TB, the terminal may transmit an HARQ-ACK using a PUCCH resource indicated by the DCI. Accordingly, according to Method 2-2, the terminal may transmit an HARQ-ACK according to a result of decoding the DCI on a PUCCH (or PUSCH). Since blind decoding is performed to decode the DCI, the terminal may no longer decode the DCI when a NACK is derived during a process of descrambling the DCI. When an ACK is derived during the process of descrambling the DCI, the terminal may know that the DCI has been successfully decoded. Accordingly, the terminal may derive an ACK and transmit the ACK on a PUCCH (or PUSCH). When the ACK is received from the terminal, the base station may consider that the terminal has successfully decoded the corresponding information (i.e., the value of $\Delta_i$ or information for deriving $\Delta_i$) from the DCI.

When the DCI allocates a TB, the terminal may transmit an HARQ-ACK using a PUCCH resource indicated by the DCI. Accordingly, according to Method 2-2, the terminal may receive a PDSCH in the resource indicated by the DCI, and transmit the HARQ-ACK according to a result of decoding the TB on a PUCCH (or PUSCH). The terminal may derive an ACK or NACK according to the result of decoding the TB. When the base station receives the ACK or NACK from the terminal, it can be interpreted that the terminal has successfully received the DCI, and thus the base station may consider that the terminal has successfully decoded the corresponding information (i.e., value of $\Delta_i$ or information for deriving $\Delta_i$) included in the DCI.

(ii) Method of Using a UE-Specific PDSCH

Method 2-3: A PDSCH May Include Information (i.e., Value of $\Delta_i$ or Information for Deriving $\Delta_i$) Transmitted to the Terminal i.

The terminal i may assume that the DCI is transmitted to the terminal i based on a scrambling of the DCI. A PDSCH for the terminal i may be allocated by the DCI. The PDSCH may include the value of $\Delta_i$ or the information for deriving $\Delta_i$. For example, the information for deriving $\Delta_i$ may be a TA. In this case, the TA may be included in a MAC (sub)protocol data unit (PDU) generated in the MAC layer.

The base station may receive PUSCH/PUCCH/SRS/PRACHs from a plurality of terminals. Accordingly, in order to maintain orthogonality between them, the base station may indicate a TA to each terminal so that the PUSCH/PUCCH/SRS/PRACH of each terminal can be received within a predetermined time. The terminal may identify a TA in an initial access phase with the base station, and thereafter, the terminal may increase, maintain, or decrease the TA by receiving a TA command (TAC) through higher layer signaling. As an example of the higher layer signaling, a MAC layer message (e.g., a MAC random access response (RAR) or a MAC control element (CE)) may be used.

The positions and order of bits constituting the MAC RAR or MAC CE described below are an example, and they may have predetermined different orders.

Figure 5A:
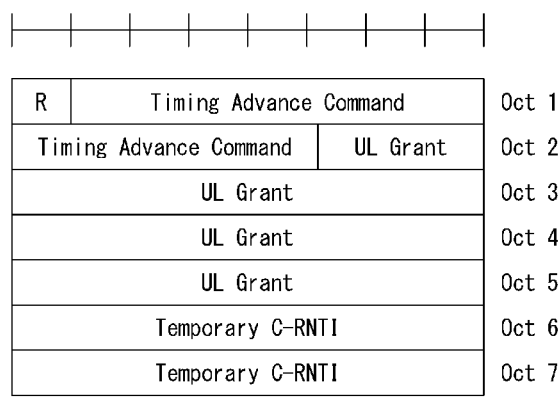
FIGS. 5A and 5B are conceptual diagrams illustrating exemplary embodiments of a MAC RAR including a TAC.
Figure 5B:
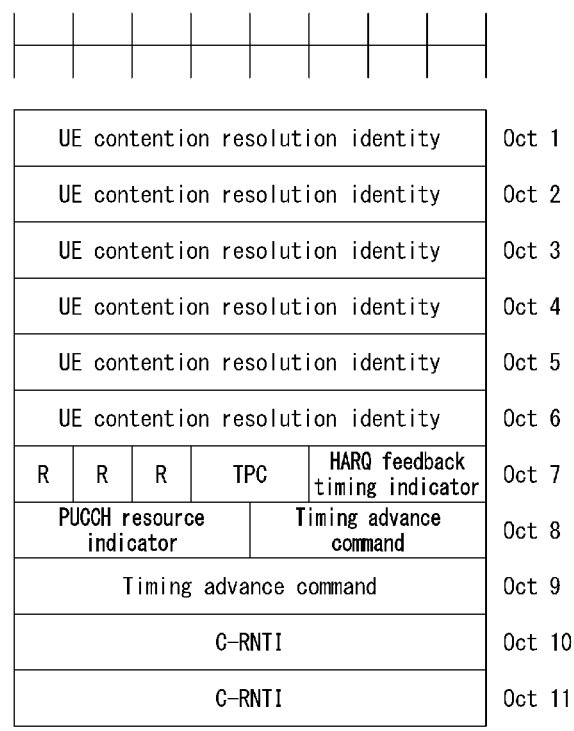

FIGS. 5A and 5B are conceptual diagrams illustrating exemplary embodiments of a MAC RAR including a TAC.

FIG. 5A shows a structure of a fallback RAR message, and FIG. 5B shows a structure of a success RAR message. The base station may estimate a TA of a terminal using a physical random access channel (PRACH) preamble or SRS received from the terminal. The MAC RAR message received from the base station in the initial access phase includes a TAC. The MAC RAR message also includes an RNTI (i.e., TC-RNTI) to be used by the terminal for transmission of a message 3 (M3) PUSCH. The terminal may decode a PDSCH to which the MAC RAR is mapped using an RA-RNTI. In the case of the MAC RAR message of FIG. 5A, for example, when the terminal transmits a M3 PUSCH based on the MAC RAR, the terminal may use a TAC included in Octet 1 and Octet 2, and may derive an uplink grant for transmitting the M3 PUSCH from Octet 2, Octet 3, Octet 4, and Octet 5. Here, a bit indicated by 'R' in Octet 1 is a reserved bit, and may not be used for the MAC RAR. On the other hand, after the initial access is completed and an RRC connection is established, the base station may indicate a TAC to the terminal by using a MAC CE.

Figure 6:
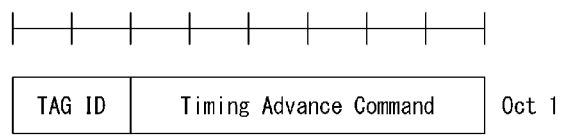
FIGS. 6 and 7 are conceptual diagrams illustrating exemplary embodiments a MAC CEs including a TAC.
Figure 7:
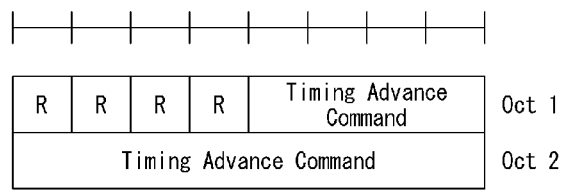

FIGS. 6 and 7 are conceptual diagrams illustrating exemplary embodiments a MAC CEs including a TAC.

Referring to FIG. 6, according to the technical specification, information on a TAC may be expressed with one byte in a MAC (sub)PDU. The TAC may be represented by 6 bits. A timing advance group (TAG) ID indicates identification information of a TAG to which the TAC is applied. When carrier aggregation is configured for the terminal, the base station may configure a TAG to which one or more serving cells belong to the terminal. Since the same TA may be applied to serving cells belonging to the TAG, the TAC may be applicable to the TAG.

Referring to FIG. 7, a MAC CE in which information on a TAC is expressed with two bytes may be used. In this case, since the TAC is represented by 12 bits, a TA may be expressed with the same range as in the MAC RAR message. Here, 'R' means a reserved bit and may not be used for other purposes.

Meanwhile, the TAC fields included in the MAC RAR messages of FIGS. 5A and 5B and the MAC CEs of FIGS. 6 and 7 may be interpreted differently for each terminal. A value indicated in the MAC RAR messages of FIGS. 5A and 5B and the TAC fields of the MAC CEs of FIG. 7 may be an initial TA value. Accordingly, the terminal may not accumulate the value of the TAC field included in the MAC RAR messages of FIGS. 5A and 5B and the MAC CEs of FIG. 7 in a current TA of the terminal. Instead, the terminal may regard the value of the received TAC field as a new TA. Meanwhile, a value (i.e., offset) of the TAC field included in the MAC CE of FIG. 6 may be accumulated in a current TA that the terminal has. For convenience of explanation, regardless of whether the value of the TAC field is used as a new TA or as a value to be accumulated in a current TA, the value included in the TAC field of MAC CE or MAC RAR is collectively referred to as 'TAC'.

The TA may be indicated to the terminal as a natural number, and the terminal may convert it in a method defined in the technical specification. For example, according to the technical specification (i.e., 3GPP TS 38 series), the TA may be given in units of $T_c$, and $T_c$ is defined as $T_c=1/(\Delta f_{max} \cdot N_f)$ $=1/(480000\times4096)\approx5.09\times10^{-10}$ (sec). A timing at which the terminal starts uplink transmission is earlier by a time corresponding to the TA than a start time of a downlink slot. When operating in a time division duplex (TDD) scheme, a TA offset $N_{TA,offset}$ specified in the technical specification is additionally considered for switching between reception and transmission. In the TDD scheme, a sum of the TA and the TA offset is given in units of $T_c$. That is, it is defined as $T_{TA}=(N_{TA}+N_{TA,offset})\cdot T_c$.

When a frequency division duplex (FDD) system operating in a frequency range 1 (FR1) does not coexist with the LTE, $N_{TA,offset}=25600 \cdot T_c \approx 13$ (us) may occur. In a BWP having a subcarrier spacing of 30 kHz, one symbol has a length of about 37 us, and $N_{TA,offset}$ may correspond to about 36% of the symbol length. On the other hand, when the FDD system operating in a frequency range 2 (FR2) coexists with the LTE, $N_{TA,offset}=39936 \cdot T_c \approx 20$ (us) may occur. In a BWP having a subcarrier spacing of 30 kHz, one symbol has a length of about 35.7 us, and $N_{TA,offset}$ may correspond to about 57% of the symbol length.

In addition, in a system operating in the frequency range 2 (FR2), $N_{TA,offset}=13792 \cdot T_c \approx 7.0$ (us) may occur. In a BWP having a subcarrier spacing of 60 kHz, one symbol has a length of about 17.9 us, and $N_{TA,offset}$ may correspond to about 125.3% of the symbol length.

In half-duplex communication, in order for the terminal to perform switching between transmission and reception, it takes a time of $N_{Rx-Tx}=N_{Tx-Rx}=25600 \cdot T_c$, so an interval of about $1.30\times10^{-5}$ (sec) is required.

The unit of TAC (i.e., TAC unit) may have a value defined in the technical specification. For example, the TAC unit may be given as $16 \cdot 64 \cdot T_c/2^u$. In a BWP having a subcarrier spacing of 30 kHz, the TAC unit may be $16 \cdot 64 \cdot T_c/2^1 \approx 26.0$ (us), and in a BWP having a subcarrier spacing of 60 kHz, the TAC unit may be $16 \cdot 64 \cdot T_c/2^2 \approx 13.0$ (us).

(3) Methods of Using UE Group-Specific Downlink Channels (i) Method of Using a UE Group-Specific PDCCH In case of multicast, the base station may use the same downlink channel as the downlink channel for the terminal j(i≠j) belonging to the same terminal group in order to transmit the value of $\Delta_i$ or the information for deriving $\Delta_i$ to the terminal i. For example, the value of $\Delta_i$ or the information for deriving $\Delta_i$ may be a propagation delay or a transmit and receive time difference (i.e., Rx–Tx time difference) measured by the base station.

Method 3-1: The Base Station May Indicate a Radio Identifier of a Terminal Group to Each Terminal of the Terminal Group Through Higher Layer Signaling.

The base station may allocate DCI to a terminal group j and apply a radio identifier of the terminal group j when scrambling the DCI. The information (i.e., value of $\Delta_i$ or information for deriving $\Delta_i$) required for the terminal i belonging to the terminal group j may be included in the DCI.

The terminal may be indicated the radio identifier and a search space for receiving the corresponding DCI through higher layer signaling. The terminal i belonging to the terminal group j may detect the DCI in the indicated search space, and perform descrambling with the indicated radio identifier.

Method 3-2: A Specific Field of the DCI May Include the Information (i.e., the Value of $\Delta_i$ or the Information for Deriving $\Delta_i$) Required for the Terminal i Belonging to the Terminal Group j.

Method 3-3: When Performing Method 3-2, the Position of the Information (i.e., the Value of $\Delta_i$ or the Information for Deriving $\Delta_i$) Required for the Terminal i in the DCI May be Indicated by Higher Layer Signaling.

The terminal i may detect the DCI and obtain the necessary information at the position of the specific field.

Method 3-4: When Performing Method 3-2, the DCI May Include Information on a Resource of a PUCCH to be Used for the Terminal i to Transmit an HARQ-ACK for the Value of $\Delta_i$ or the Information for Deriving $\Delta_i$.

In order for the terminal to transmit a PUCCH, a resource index of the PUCCH should be known to the terminal. In addition, a timing of the HARQ-ACK, a transmission power of the PUCCH, and the like should be known to each terminal. Value(s) indicated by other field(s) of the DCI may be commonly used by the terminals belonging to the terminal group, but a resource index applied to a PUCCH should be indicated as a unique value for each terminal.

When the DCI does not allocate a TB, the terminal may transmit an HARQ-ACK using a PUCCH resource indicated by the DCI. Accordingly, according to Method 3-4, the terminal may transmit an HARQ-ACK according to a result of decoding the DCI on a PUCCH (or PUSCH). Since blind decoding is performed to decode the DCI, the terminal may no longer decode the DCI when a NACK is derived during a process of descrambling the DCI. When an ACK is derived during the process of descrambling the DCI, the terminal may know that the DCI has been successfully decoded. Accordingly, the terminal may derive an ACK and transmit the ACK on a PUCCH (or PUSCH). When the ACK is received from the terminal, the base station may consider that the terminal has successfully decoded the corresponding information (i.e., the value of $\Delta_i$ or information for deriving $\Delta_i$) from the DCI.

When the DCI allocates a TB, the terminal may transmit an HARQ-ACK using a PUCCH resource indicated by the DCI. Accordingly, according to Method 3-4, the terminal may receive a PDSCH in the resource indicated by the DCI, and transmit the HARQ-ACK according to a result of decoding the TB on a PUCCH (or PUSCH). The terminal may derive an ACK or NACK according to the result of decoding the TB. When the base station receives the ACK or NACK from the terminal, it can be interpreted that the terminal has successfully received the DCI, and thus the base station may consider that the terminal has successfully decoded the corresponding information (i.e., value of $\Delta_i$ or information for deriving $\Delta_i$) included in the DCI.

(ii) Method of Using a UE Group-Specific PDSCH

In case of multicast, the base station may transmit one downlink channel to predetermined terminals (e.g., terminals belonging to a terminal group). The downlink channel may include all information for deriving values of $\Delta_i$ or information for deriving $\Delta_i$ for the predetermined terminals. The predetermined terminals may receive the same downlink channel, and information on each terminal may be obtained from the downlink channel.

Method 3-5: A Separate Radio Identifier is Assigned to a Terminal Group, and the Terminal Group May Use the Radio Identifier to Receive the Downlink Channel.

The base station may configure a radio identifier to predetermined terminals through higher layer signaling in order to designate the predetermined terminals as a group.

A reference time (e.g., UTC) may be indicated to the terminal group as included in a MAC service data unit(s) (SDU) by using an RRC message. In addition, offset(s) to be applied to the terminals belonging to the terminal group may be indicated using MAC CE(s). When the base station generates a MAC (sub)PDU, MAC SDU(s) and MAC CE(s) may be multiplexed and transmitted on a PDSCH.

Alternatively, a MAC CE may be generated for each terminal only with an offset required for each terminal belonging to the terminal group (e.g., the value of $\Delta_i$ or the information for deriving $\Delta_i$ for the terminal i), and MAC CEs for the terminals may multiplexed to generate a MAC PDU.

Method 3-6: An Offset for a Terminal and/or Identification Information of the Terminal are Included in a MAC CE.

There is a need for a method for identifying an offset for a specific terminal i among the terminals belonging to the terminal group. According to Method 3-6, the identification information and the offset of the terminal may be included together in the MAC CE.

Figure 8:
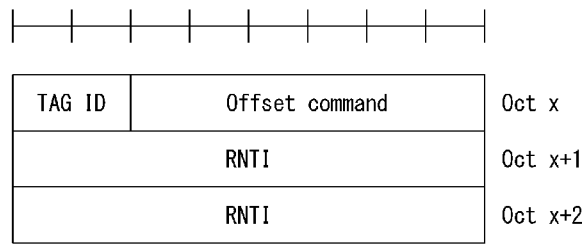
FIGS. 8 and 9 are conceptual diagrams for describing exemplary embodiments of a MAC CE including an offset.
Figure 9:
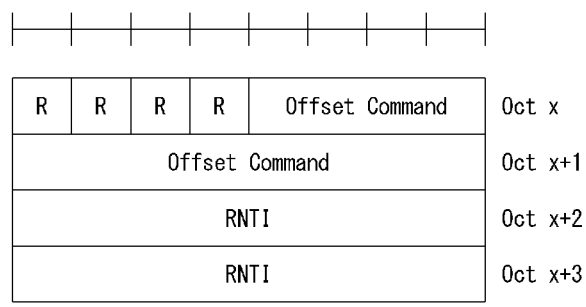

FIGS. 8 and 9 are conceptual diagrams for describing exemplary embodiments of a MAC CE including an offset.

Referring to FIG. 8, a TAG ID and an offset for estimating a downlink propagation delay (i.e., offset command) may be included in a MAC CE, and additionally, identification information (i.e., RNTI) of the terminal may be included in a MAC CE. Here, Octet x, Octet x+1, and Oct x+2 need not necessarily have this order. If the offset means a TAC, Octet x of FIG. 8 may be the same as Octet 1 of FIG. 6.

Referring to FIG. 9, the offset for estimating the downlink propagation delay and the identification information (i.e., RNTI) of the terminal are included in the MAC CE as in the example of FIG. 8. When the offset means a TAC, Octet x of FIG. 9 may be the same as Octet 1 of FIG. 7.

In FIGS. 8 and 9, the RNTI may be included in the MAC CE as the identification information of the terminal. For example, when the terminal establishes an RRC connection with the base station, the identification information of the terminal may be C-RNTI, MCS-C-RNTI, or CS-RNTI. For example, when the terminal does not configure an RRC connection with the base station, the identifier of the terminal may be a temporary cell (TC)-RNTI. Since the RNTI is represented by 16 bits, the RNTI in the MAC CEs of FIGS. 8 and 9 may be expressed by two octets (i.e., Octet x+1 and Octet x+2).

If there is an additional identifier (e.g., group member ID) that identifies the terminal i in the terminal group, the corresponding identifier may be included in the MAC CE instead of the RNTI. In this case, the corresponding identifier may be derived from the RNTI of the terminal.

Using Method 3-6, terminals located at a sufficiently close distance to the base station (e.g., within 100 m) and do not need compensation for downlink propagation delays may also receive the MAC (sub)PDU. For example, the DCI and/or PDSCH may be scrambled as an RNTI allocated to the terminal group. When a terminal belonging to the terminal group identifies its identification information in the received MAC CE, the terminal may obtain an offset corresponding to its identification information. On the other hand, when a terminal belonging to the terminal group does not identify its identification information in the received MAC CE, the terminal may determine that the offset is unnecessary for it.

In the MAC CEs of FIGS. 8 and 9, the offset may mean a TAC.

(4) Methods of Indicating an Offset Based on a Single Closed Loop

In a time-sensitive network, the base station may deliver a reference time (e.g., UTC) to the terminal by including it in the MAC SDU, and the terminal may interpret the reference time to compensate for the time when the MAC SDU is received (i.e., the delay time caused by the reception of the PDSCH). That is, the terminal may estimate an effect according to a downlink propagation delay.

The offset (e.g., TA or RTT) managed by the base station for each terminal refers to a sum of a downlink propagation delay and an uplink propagation delay. When a gap between uplink frequency and downlink frequency (i.e., duplex gap) is sufficiently small (i.e., when operating in the TDD scheme, or the duplex gap is small while operating in the FDD scheme), the downlink propagation delay and the uplink propagation delay may have similar values. In this case, the downlink propagation delay may be obtained from the offset. Therefore, Method 4-1 may be used.

When the offset is a TA, the terminal may interpret a half of a value obtained by subtracting $N_{TA,offset}$ from the TA as the downlink propagation delay.

Meanwhile, when a duplex gap is quite large in the system operating in the FDD scheme, the downlink propagation delay and the uplink propagation delay may not be the same. In this case, when Method 4-1 is applied, the downlink propagation delay may be estimated incorrectly. However, by managing the TA more accurately, it is possible to reduce the error to a desired amount.

In order to more accurately estimate a downlink propagation delay, the base station may indicate the terminal to interpret a TAC for managing the TA in a finer unit. If the TAC has a finer unit, since the terminal has a finer TA, the terminal may more accurately estimate the downlink propagation delay. Therefore, a method for the base station to indicate the TAC unit to the terminal may be required.

Method 4-2: The Base Station May Indicate the TAC Unit to the Terminal Through RRC Signaling.

The base station may indicate the TAC unit to the terminal through RRC signaling. If the base station does not operate according to the scenario related to the time-sensitive network, the base station may not perform separate RRC signaling to the terminal. The terminal may operate based on an unit 1 for the TAC (i.e., a value determined in the technical specification (e.g., $16 \cdot 64 \cdot T_c/2^u$ (sec)) or a default value applied when there is no separate signaling). When the base station operates according to the scenario related to the time-sensitive network, the base station may indicate to the terminal an unit 2 for the TAC through RRC signaling. The unit 2 for the TAC may be a finer unit than the unit 1 for the TAC. The base station may indicate a TAC to the terminal by using a MAC CE, and the terminal may apply the unit 1 or the unit 2 for the TAC to the received TAC according to RRC signaling.

Using Method 4-2, a time when the change of the TAC unit according to the RRC signaling is applied may be immediately after the terminal transmits an ACK to the base station by using a PUCCH (or PUSCH) or after a predetermined time elapses from the transmission timing of the ACK. Alternatively, in order to determine a time when the change of the TAC unit according to the RRC signaling is applied, the terminal may have to transmit a separate RRC signaling to the base station. This is because a response (e.g., ACK) to the RRC signaling may also be transmitted through RRC signaling. Alternatively, it may be predetermined by the technical specification that the TAC unit is changed after a predetermined time (e.g., a time corresponding to a predetermined number of slots or symbols).

Method 4-3: An Event in which the TAC Unit is Changed without Separate Signaling May be Predefined.

When an event in which the TAC unit is changed is defined, the terminal may change the TAC unit from the unit 1 to the unit 2 or from the unit 2 to the unit 1, from the time of occurrence of the event or a predetermined time after the occurrence of the event.

For example, at a time when an initial access procedure is completed (i.e., when it is determined that the decoding of the M4 PDSCH is successful), the terminal may change the TAC unit from the unit 1 to the unit 2 or from the unit 2 to the unit 1.

As another example, after the terminal establishes an RRC connection, if the terminal performs an initial access procedure again to the same cell, the TAC unit may be changed. For example, when the terminal configuring the RRC connection performs random access, the TAC unit may be changed to another unit. If the terminal performs random access while the unit 1 is being applied, it may be interpreted that the unit 2 is applied. On the other hand, if the terminal performs random access while the unit 2 is being applied, it may be interpreted that the unit 1 is applied.

As another example, after the terminal establishes the RRC connection, when higher layer signaling indicating the terminal to perform a time-sensitive service is received from the base station, the unit 2 may be applied as the TAC unit. When the time-sensitive service is not performed, the terminal applies the unit 1, but when indicated to perform the time-sensitive service through higher layer signaling, the terminal may apply the unit 2.

As another example, when a new initial value of TA is received from the terminal, the TAC unit may be changed. When an (absolute) value of the TA is transmitted to the terminal, the terminal may not accumulate and apply a TAC to the stored TA, but may replace the stored TA with the indicated new value. In this case, the terminal may interpret the indicated value based on the unit 1 or the unit 2. When the MAC RAR shown in FIG. 5A or 5B or the MAC CE shown in FIG. 7 is received, the terminal may newly calculate the TA, and at this time, the TAC unit may be changed. That is, when the terminal applies the unit i($\in\{1, 2\}$) and a MAC RAR or MAC CE including a new TA is received, the unit j($\in\{1,2\}$, $\neq$i) may be applied.

Method 4-4: A MAC CE May Indicate the TAC Unit.

FIGS. 10A, 10B, 11A, 11B, 12A, 12B, 13A, and 13B are conceptual diagrams illustrating structures of a MAC CE including information indicating a unit applied to a TAC.

The MAC CE may indicate the TAC unit as well as TAC. As in Method 4-2, the unit 1 or unit 2 for the TAC may be indicated by the MAC CE. If the MAC CE indicates the unit 1 or the unit 2, the terminal may apply the indicated unit when accumulating the TAC in the TA.

Figure 10A:
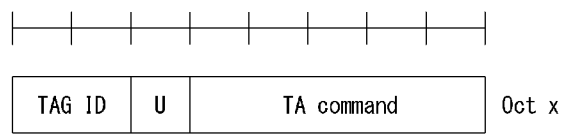
FIGS. 10A, 10B, 11A, 11B, 12A, 12B, 13A, and 13B are conceptual diagrams illustrating structures of a MAC CE including information indicating a unit applied to a TAC.
Figure 10B:
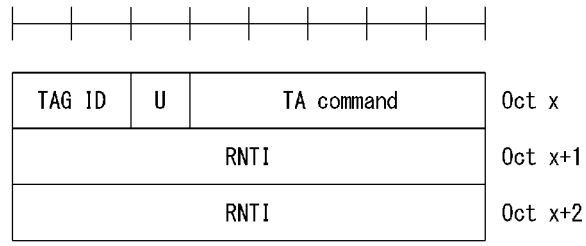

FIG. 10A shows a case in which a TAC unit ('U') is included in a MAC CE transmitted on a UE-specific PDSCH, and FIG. 10B shows a case in which a TAC unit ('U') is included in a MAC CE transmitted on a UE group-specific PDSCH.

The base station may indicate to the terminal whether the MAC CE includes the TAC unit through RRC signaling. That is, according to RRC signaling, the MAC CE may not include the TAC unit, and the terminal may assume that the TAC unit is basically designated as the unit 1. If the MAC CE is indicated to include the TAC unit according to RRC signaling, the terminal may assume that the TAC unit is given by the MAC CE as the unit 1 or unit 2.

In an example, when the MAC CE includes the TAC unit, a range of values that the TAC may have may be reduced. Since the MAC CE indicating a TA to the terminal has a size in bytes, the number of bits allocated to the TAG ID or TAC may be reduced in order to include the information indicating the TAC unit in the MAC CE. When the terminal does not operate based on a time-sensitive service, since the terminal may operate according to a general procedure (i.e., unit 1 for TAC), the terminal may assume that a TA with a certain degree of accuracy is secured. When the base station indicates the terminal to operate based on a time-sensitive service, a TAC having sufficient accuracy according to the unit 2 may be indicated to the terminal even when the range of values that the TAC may have is reduced.

Figure 11A:
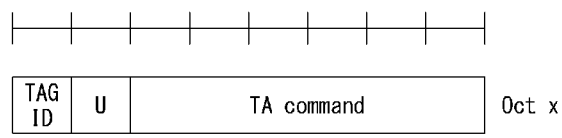
Figure 11B:
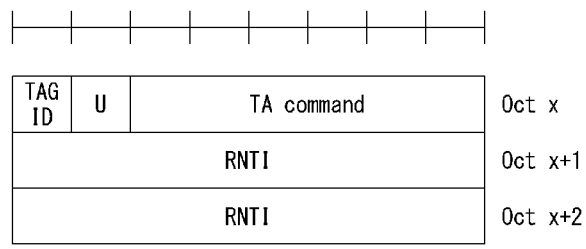
Figure 12A:
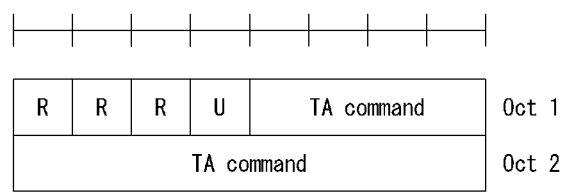
Figure 12B:
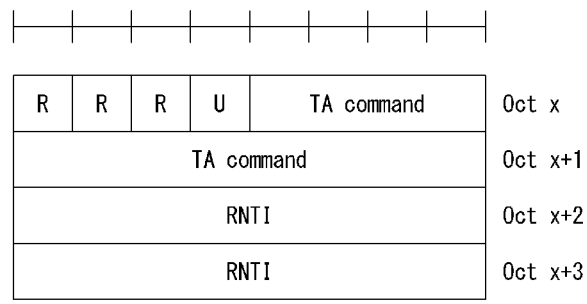
Figure 13A:
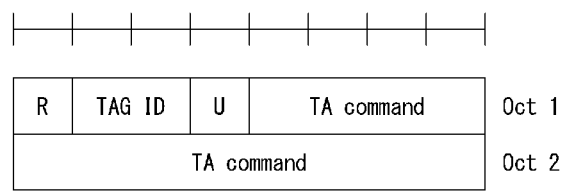
Figure 13B:
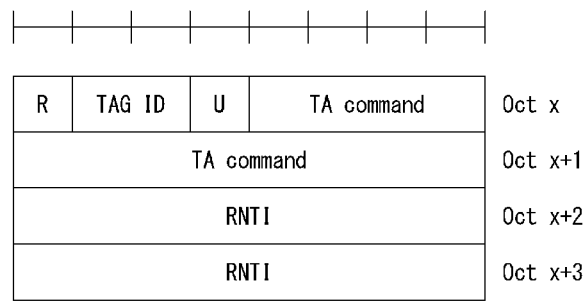

In an example, when the unit for TAC is included in the MAC CE, a range of values that the TAG ID may have may be reduced. The terminal may be configured with a maximum of 4 TAGs or less, and may manage TAs for the respective TAGs. However, there may be at most 2 TAGs utilizing time-sensitive services. Accordingly, a length of a TAG ID of a TAG operating based on the unit 1 for TA and a length of a TAG ID of a TAG ID operating based on the unit 2 for TA may be different from each other, and interpretation schemes therefor also may be different from each other. Referring to FIGS. 11A and 11B, it can be seen that the length of the field indicating the TAG ID is reduced from 2 bits to 1 bit compared to the MAC CEs shown in FIGS. 10A and 10B. That is, it is possible to increase the length of the field indicating the TAC by reducing the length of the TAG ID.

The base station may configure up to two TAGs utilizing time-sensitive services to the terminal. Accordingly, the base station may indicate TAG(s) capable of operating based on the unit 2 for TAC to the terminal through higher layer signaling. Alternatively, if MAC CEs including TAC are multiplexed in a MAC SDU including a UTC, the MAC CEs for this case may be interpreted as having the structure shown in FIG. 11A or 11B. For example, when the TAG ID is a or b, the TAC unit may follow the unit indicated by the MAC CE.

Method 4-5: When Applying Method 4-4, the TAC Unit May be Indicated Using a Reserved Bit(s) of a MAC CE.

When a MAC CE includes the TAC unit, a reserved bit(s) may be used to maintain a range of values that the TAC may have. Referring to the structures of the MAC CEs shown in FIGS. 12A and 12B, in the MAC CE having a length of 2 bytes, the TAC may be represented by 12 bits, and the TAC unit (i.e., IP) may be indicated by using some of the remaining bits. More specifically, in the MAC CE structure shown in FIG. 7, the TAC unit may be indicated by using one bit among four bits given as reserved bits.

When the MAC CE includes the TAC unit, a reserved bit may be used to maintain a range of values that the TAC may have. Referring to the structures of the MAC CEs shown in FIGS. 13A and 13B, in the MAC CE having a length of 2 bytes, the TAC may be represented by 12 bits, and a TAG ID to which the TAC is applied may be additionally included. More specifically, in the MAC CE structure shown in FIG. 7, the TAC unit may be indicated using one of the four bits given as reserved bits, and the TAG ID may be indicated using two bits.

Meanwhile, information indicating the TAC unit may be included in a MAC RAR, not the MAC CE.

Figure 14A:
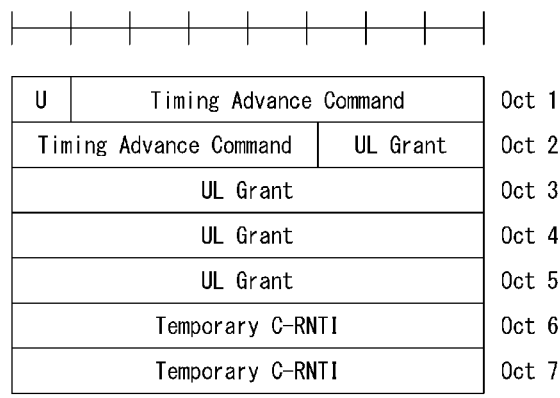
FIGS. 14A and 14B are conceptual diagrams illustrating structures of a MAC RAR including information indicating a TAC unit.
Figure 14B:
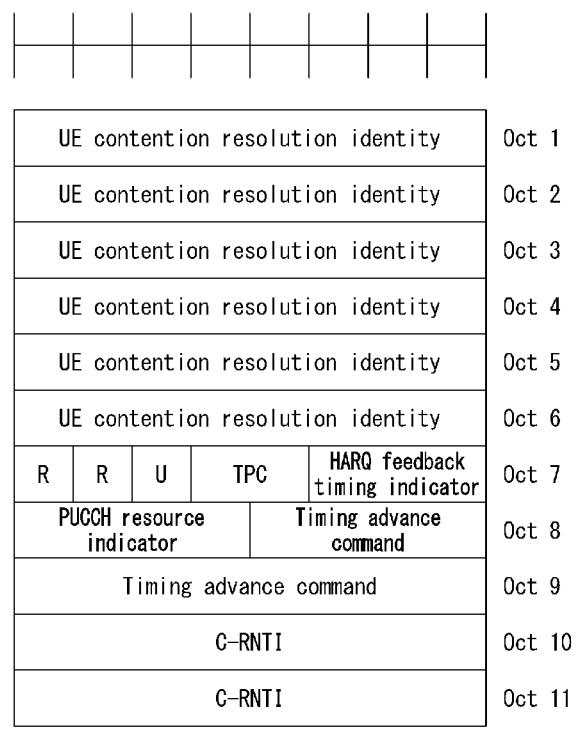
Figure 16A:
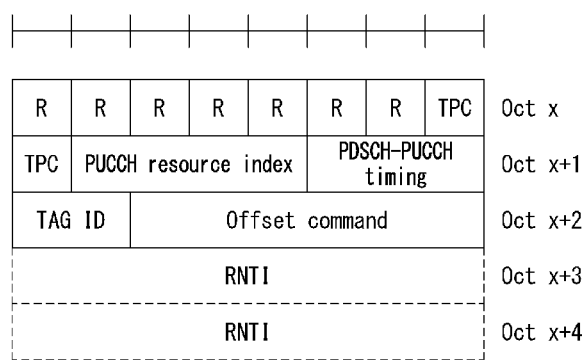
FIGS. 16A to 16D and FIGS. 17A to 17D are conceptual diagrams for describing structures of MAC CEs including information for transmission of an HARQ-ACK.
Figure 16B:
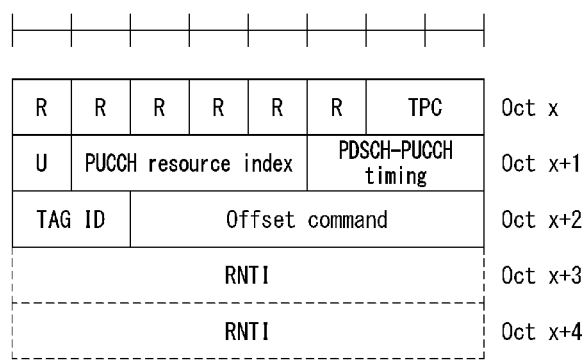
Figure 16C:
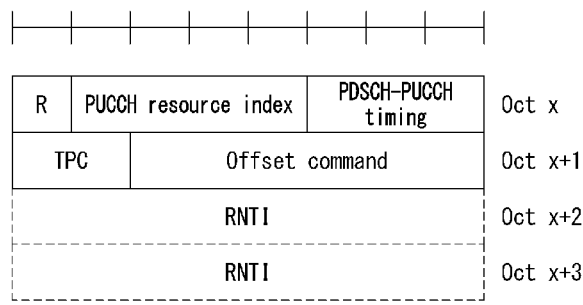
Figure 16D:
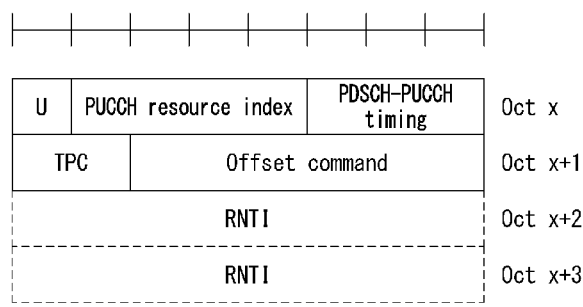
Figure 17A:
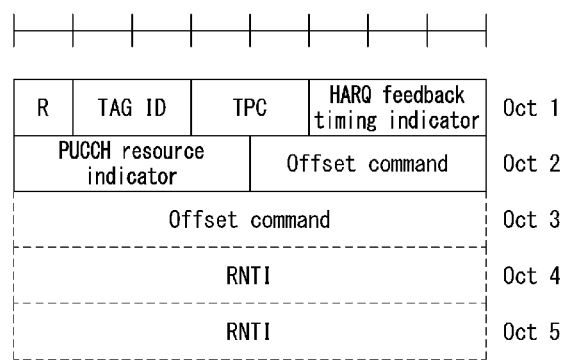
Figure 17B:
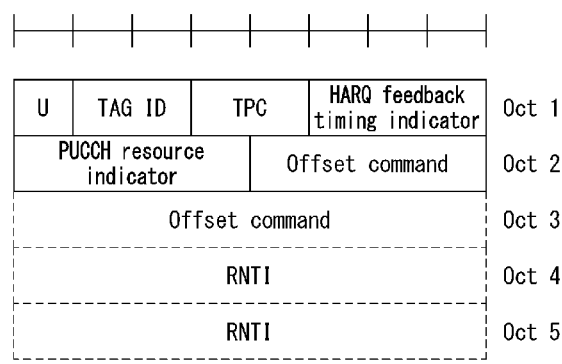
Figure 17C:
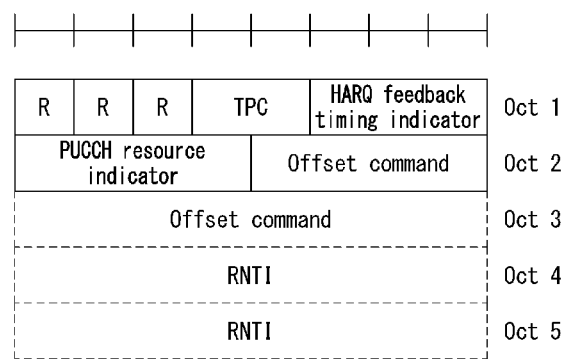
Figure 17D:
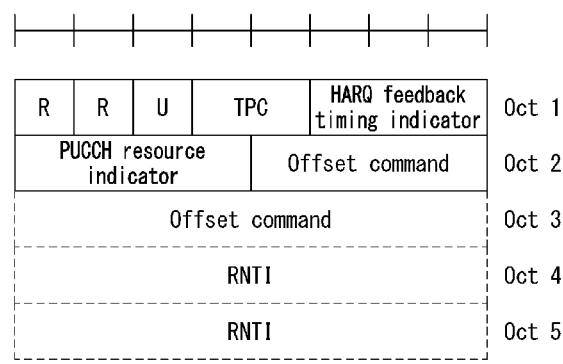

FIGS. 14A and 14B are conceptual diagrams illustrating structures of a MAC RAR including information indicating a TAC unit.

When the MAC CE includes the TAC unit, a reserved bit(s) may be used to maintain a range of values that the TAC may have. Referring to the MAC RARs shown in FIGS. 14A and 14B, the TAC may be represented by 12 bits, and the TAC unit may be indicated by using a bit given as a reserved bit in the MAC RAR structures shown in FIGS. 5A and 5B.

Method 4-6: A Combination of the TAG ID and the TAC Unit May be Indicated by an Index Since time-sensitive services do not need to be performed for all TAGs, the TAG ID and the TAC unit may be expressed by being compressed. To this end, the base station may indicate to the terminal by higher layer signaling that an index for a combination of the TAG ID and the TAC unit may be indicated.

When an index indicated through a MAC CE is expressed by, for example, 2 bits, the base station may indicate to the terminal an interpretation scheme according to the index by higher layer signaling.

FIG. 15 is a conceptual diagram illustrating a case of indexing combinations of a TAG ID and a TAC unit.

Referring to FIG. 15, a range of the TAG ID may be indicated by higher layer signaling. For example, up to 4 TAGs may be supported. Referring to FIG. 15, the unit 1 or unit 2 may be applied as the TAC unit.

Method 4-7: When a Serving Cell or TAG Utilizing the Time-Sensitive Service is Fixed as One, the Unit 2 May be Applied as a TAC Unit without Additional Signaling from the Base Station.

A serving cell in which a time-sensitive service is activated may be fixed to the one serving cell. For a serving cell that transmits a MAC (sub)PDU including a reference time (e.g., UTC), one TAG ID to which an uplink carrier for the corresponding serving cell belongs may be determined. In this case, a TAC included in a MAC CE in which an ID of the corresponding TAG is indicated may be interpreted by applying the unit 2. Therefore, without additional explicit signaling from the base station, the terminal may interpret the unit for TAC as the unit 2. For example, assuming that the time-sensitive service is utilized only in a TAG corresponding to a specific TAG ID (e.g., 2), it may be assumed that the unit 2 is applied to a TAC included in a MAC CE indicated by the TAG ID 2.

(5) Methods of Estimating a Propagation Delay Based on Multiple Closed Loops

In order to support the time-sensitive service, the terminal may not necessarily need to maintain each TA in a fine tune. This is because in the time-sensitive service, the basic purpose is for the terminal to receive a reference time (e.g., UTC) from the base station and compensate for a downlink propagation delay. In addition, the method of estimating the downlink propagation delay by a half of the TA may also have a large error according to the duplex gap. In addition, since the shared time may exist in the terminal or the base station, the downlink propagation delay and the uplink propagation delay may need to be classified according to an entity having the shared time. However, in a general case, since the downlink propagation delay and the uplink propagation delay do not differ significantly, they may be regarded as having the same value.

The base station may introduce an additional closed loop while maintaining the conventional closed loop for indicating a TAC to the terminal i. The additional closed loop may indicate a TAC or an offset (e.g., offset derived from RTT or Rx–Tx time difference) to estimate the propagation delay (i.e., $\Delta_i$).

The terminal supporting the time-sensitive service may maintain compatibility for the conventional technical specification because the existing closed loop is used as it is and the additional closed loop is used. Here, the offset (e.g., TAC, RTT, or Rx–Tx time difference) indicated to the terminal may be included in a UE-specific DCI, a UE-specific PDSCH, a UE group-specific DCI, or a UE group-specific PDSCH.

Method 5-1: The TAC May be Indicated by the Additional Closed Loop, and a Finer Unit than that of the TAC Indicated by the Conventional Closed Loop May be Applied to the TAC Indicated by the Additional Closed Loop.

The terminal may be indicated two closed loops that manage TAC. One closed loop (i.e., closed loop 1) may be used to indicate to the terminal a TAC to which a general unit (i.e., unit 1) is applied, and the other closed loop (i.e., closed loop 2) may be used to indicate to the terminal a TAC to which a finer unit (i.e., unit 2) is applied. Here, the unit 2 may be indicated to the terminal by higher layer signaling.

As an example, the terminal may derive a TA by accumulating TACs obtained from the closed loop 1 and the closed loop 2. The derived TA may be used when the terminal performs uplink transmission, and may be used by the terminal to estimate a propagation delay. The propagation delay may be determined from the derived TA.

As another example, the terminal may derive a TA by accumulating at least the TAC obtained from the closed loop 1. The derived TA may be used when the terminal performs uplink transmission. However, the TAC obtained from the closed loop 2 may not be reflected in the TA for uplink transmission. The base station should maintain a periodicity of the closed loop 1 so that orthogonality of uplink transmissions can be guaranteed even with the closed loop 1 alone. That is, the additional closed loop 2 may not be forced to be reflected in the TA. One implementation of the terminal may derive the TA by using both the closed loop 1 and the closed loop 2, and another implementation of the terminal may derive the TA by using only the closed loop 1. The closed loop 2 is not used for uplink transmission, but may be used to estimate a downlink propagation delay. That is, the terminal may accumulate the TACs obtained from the closed loop 1 and the closed loop 2 to obtain one TA value, and the obtained TA value may be used to determine the downlink propagation delay.

Method 5-2: An Additional Closed Loop May Indicate an Offset for Estimating a Propagation Delay.

One closed loop for managing TACs is given to the terminal, and the other closed loop may indicate an offset for compensating for a propagation delay. The terminal may estimate a downlink propagation delay from the TA with a predetermined accuracy, and may more accurately estimate the downlink propagation delay by using the additionally indicated offset.

An example of such the offset may be RTT or Rx–Tx time difference. The terminal may estimate the TA by using the closed loop, and may be indicated the RTT in the additional closed loop or estimate the RTT by receiving the Rx–Tx time difference. When the RTT is estimated by using the TA, as an approximate TA for estimating the RTT, a value estimated by the terminal using one of the closed loops may be applied.

(6) Methods of Using UE-Specific Uplink Channels

The terminal may transmit or receive the RTT, Rx–Tx time difference, or the TA with the base station. As proposed in Method 3-6, the base station may transmit a value of $\Delta_i$ or information for deriving $\Delta_i$ to the terminal i by including it in a UE-specific PDSCH. On the other hand, the terminal i may report a value of $\Delta_i$ or information for deriving $\Delta_i$ to the base station. This means reporting using a PUSCH, and will be described later as Method 6-1.

Method 6-1: A MAC CE Including Only an Offset Required for a Terminal Belonging to a Terminal Group (e.g., a Value of $\Delta_i$ or Information for Deriving $\Delta_i$ for the Terminal i) is Generated, and the MAC CE May be Included in a MAC (Sub)PDU.

Here, the MAC CE may use the structures described above.

The base station may compensate for the propagation delay using the information received from the terminal i. It may be utilized when the base station receives a time shared by the terminal i and performs reception by compensating for the propagation delay. In addition, it may be utilized when the terminal i receives a time shared by the base station and the base station performs transmission by compensating for the propagation delay in the base station.

(7) HARQ-ACK Transmission Methods

Since a MAC (sub)PDU generated by the base station is received by a plurality of terminals, the terminal may generate an HARQ-ACK for this but may not feed it back to the base station. It may be assumed that the terminal can obtain sufficient information for correcting a downlink propagation delay for a reference time (e.g., a value of $\Delta_i$ or information for deriving $\Delta_i$ for the terminal) from the MAC (sub)PDU. However, since the time-sensitive service may require a very low error rate, it may be preferable for the terminal to explicitly transmit the HARQ-ACK for the value of $\Delta_i$ or the information for deriving $\Delta_i$ for the terminal.

Method 7-1: The MAC CE May Include Information on a Resource of a PUCCH for Transmission of an HARQ-ACK.

When the base station transmits a PDSCH, the base station may indicate to the terminal a resource index of a PUCCH for transmitting an HARQ-ACK through scheduling DCI, activating DCI, or RRC signaling. Since the base station may transmit the PDSCH to multiple terminals, it may be preferable for the base station to indicate to each terminal a unique PUCCH resource.

In order to indicate the resource of the PUCCH, it may be preferable that the base station indicate to the terminal an offset of a slot for transmitting the PUCCH, a resource index of the PUCCH, or a transmission power control index of the PUCCH. In some cases, an offset or index indicated by the DCI may be reused.

Method 7-2: When Applying Method 7-1, the MAC CE May Include at Least the Resource Index of the PUCCH.

When the terminal receives the MAC (sub)PDU generated by the base station, the terminal may generate an HARQ-ACK for the MAC PDU and feed it back to the base station, and the resource index of the PUCCH including the HARQ-ACK may be determined using at least a PUCCH resource indicator (PRI) included in a MAC CE. Alternatively, the DCI may include the PRI.

Method 7-3: When Applying Method 7-2, the PRI Included in the DCI Field May not be Used, and the Resource of the PUCCH May be Determined Only with the PRI Indicated by the MAC CE.

The PRI included in the DCI field may not be used. According to Method 7-3, the MAC CE includes PRI and RNTI, and the MAC CE includes an offset for compensating for the reference time. When the terminal receives the PDSCH and identifies the MAC CE including its own C-RNTI, MCS-C-RNTI, CS-RNTI, or TC-RNTI, the terminal may determine the PUCCH resource by using the PRI included in the corresponding MAC CE.

Meanwhile, according to the conventional technical specification, when the first set of PUCCH resources has 8 or more elements, an index of the first CCE to which the DCI is mapped may be utilized together with the PRI to determine the PUCCH resource. When the same DCI is transmitted to multiple terminals, the CCEs to which the DCI is mapped are the same to the terminals, so separate information should be provided to the terminals in order to indicate different PUCCH resources to the terminals.

Method 7-4: When Applying Method 7-2, Regardless of the Number of Resources Belonging to the First Set of PUCCH Resources, the PRI May be Applied to Determine the Resource Index of the PUCCH.

Meanwhile, in order to indicate the slot in which the HARQ-ACK is transmitted, an offset from the slot in which the PDSCH is received may be indicated to the terminal. According to the conventional technical specification, the DCI allocating the PDSCH may indicate the offset from the slot in which the HARQ-ACK is transmitted. However, the DCI may not include the offset for the slot in which the HARQ-ACK is transmitted. In this case, in order for the terminal to apply Method 7-1, the MAC CE should include the offset (or timing) for the slot in which the terminal transmits the HARQ-ACK.

Method 7-5: When Applying Method 7-1, the MAC CE May Include Information on the Offset for the Slot for Transmitting the HARQ-ACK.

When Method 7-5 is not applied, the information on the slot for transmitting the HARQ-ACK may not be included in the MAC CE. In this case, the terminal may derive the slot for transmitting the PUCCH by applying the offset for the slot indicated by the DCI or the offset for the slot indicated by higher layer signaling.

When transmitting a PUCCH, a transmit power control (TPC) command to be applied by the terminal should be indicated. The terminal may receive information on a transmission power indicated by the base station through a separate DCI. For example, a PUCCH TPC command may be periodically indicated by a DCI format 2_2. The terminal may receive an additional TPC command through a MAC CE. The reason is that it is possible to increase a reception performance at the base station by adjusting the transmission power of the PUCCH, not only when the base station transmits the DCI but also when the base station transmits a PDSCH including the MAC CE.

Method 7-6: When Applying Method 7-1, a TPC Command for Controlling the Transmission Power of the PUCCH May be Additionally Included in the MAC CE and Indicated to the Terminal.

FIGS. 16A to 16D and FIGS. 17A to 17D are conceptual diagrams for describing structures of MAC CEs including information for transmission of an HARQ-ACK.

Referring to FIGS. 16A to 16D and 17A to 17D, structures of MAC CEs to which all the above-described methods are applied are shown. If a MAC CE is transmitted on a UE-specific downlink channel, the MAC CE may not need to include an identifier of a terminal, but if a MAC CE is transmitted on a UE group-specific downlink channel, the MAC CE may include an identifier of a terminal.

The size of the field(s) required to represent a resource of a PUCCH may be determined by the technical specification or higher layer signaling. In FIGS. 16A to 16D and 17A to 17D, a TPC to be applied to the PUCCH may be represented by 2 bits, a PDSCH-PUCCH timing may be represented by 3 bits, and a resource index of the PUCCH may be represented by 4 bits. However, exemplary embodiments of the present disclosure are not limited thereto.

The MAC CE may be byte-aligned, and when the size of the field(s) included in the MAC CE is less than 8 bits, reserved bits may be inserted as needed.

FIGS. 16A, 16C, 17A, and 17C show structures in which a unit ('U') for TAC or offset required for each terminal is not separately indicated. FIGS. 16B, 16D, 17B, and 17D show structures in which a unit for TAC or offset required for each terminal is indicated as included in the MAC CE. If a TAG ID is required, the TAG ID may be included in the MAC CE. If a TAG ID is not needed, the TAG ID may not be included in the MAC CE.

(8) Application Reference Time

If mobility of a terminal or a periodicity of a closed loop for managing a TA of the terminal is not appropriate, the TA of the terminal may have a relatively large relative error. According to the technical specification, in the process of managing the TA, the terminal may calculate a relative accuracy of the TA. The reason of calculating the relative accuracy is for the terminal to change the TA by itself, when the value of the TA changes too much. When the terminal observes an error equal to or greater than a reference value, the terminal may increase or decrease the TA so that the relative error of the TA is maintained below the reference value. According to the technical specification, the reference value for the relative accuracy of TA may be given. When Method 8-1, which will be described later, is applied, since the base station needs to properly manage the TA, the terminal may not need to calculate the relative error of the TA.

Method 8-1: The Base Station May Configure the Terminal Through Higher Layer Signaling so that the Terminal does not Adjust the TA by Itself.

If the terminal is allowed to arbitrarily change the TA, since the base station may not know the exact value of the TA, the base station may configure the terminal to prevent itself from changing the TA. Accordingly, when Method 8-1 is applied, a burden of control for managing TAs for all terminals belonging to the terminal group may be large on the base station.

To compensate for this, the base station may allow a terminal i to manage a TA itself, but it may be preferable that the base station and the terminal i share the same TA.

Method 8-2: Upon Receiving a TAC or an Offset for a Propagation Delay, the Terminal May Estimate a Propagation Delay from an Estimated Value of a TA or a Propagation Delay of the Terminal at a Reference Time T.

Method 8-3: In Method 8-2, a Reference Time (T) May be a Symbol or a (Sub/Mini) Slot of an Uplink Signal or Channel Last Transmitted by the Terminal to the Base Station.

A reference time or a reference TA to which the terminal i applies a value of a TA, propagation delay, offset $\Delta_i$ for deriving a propagation delay, RTT, or Rx–Tx time difference which is received from the base station may be required. The terminal i may store an estimated value of a propagation delay or a TA at the reference time T. Regardless of the reference time T, the terminal i may be allowed to continuously change the TA by itself.

The terminal i may estimate the propagation delay using the TAC, TA, offset, or Rx–Tx time difference received from the base station, excluding the TA that the terminal i changed by itself, after the reference time T. The reference time T may be a time resource including a SRS, PRACH preamble, PUSCH, or PUCCH last transmitted by the terminal i to the base station. This is because the base station estimates the TA the terminal i has by receiving an uplink signal or channel in the case of applying the TA-based scheme, but the technical specification does not restrict that only a specific uplink signal or channel is used to derive the TA.

(9) Methods of Measuring a Difference Between Reception Timings of Reference Signal(s)

When a terminal or a base station estimates a TA, RTT, Rx–Tx time difference, the terminal (or base station) sharing time may be indicated a time difference (i.e., value of $\Delta_i$ or information for deriving $\Delta_i$). The value of $\Delta_i$ or the information for deriving $\Delta_i$ may be transmitted on a PDSCH or a PUSCH. Alternatively, the value of $\Delta_i$ or the information for deriving $\Delta_i$ may be implicitly estimated by the terminal (or base station).

In order to implicitly estimate the value of $\Delta_i$ or the information for deriving $\Delta_i$ by the terminal (or base station), it may be preferable to measure a difference between timings at which reference signals are received. According to the conventional technical specification, the terminal may measure a difference between timings at which reference signals from two TRPs (or base stations) are received. More specifically, the terminal may measure a difference between timings when downlink reference signals (e.g., CSI-RS, downlink PRS, or SS/PBCH block) are received from a TRP i and a TRP j. The terminal may derive a boundary Ti of a downlink slot (or, subframe or symbol) in which a downlink reference signal is received from the TRP i, derive a boundary Tj of a downlink slot (or, subframe or slot) in which a downlink reference signal is received from the TRP j, and measure a time difference between the boundaries. Here, the TRP i may be a reference TRP, and the value measured by the terminal may be (Tj–Ti). Here, the downlink slot is a virtual slot (or reference slot) commonly interpreted by the TRP i and the TRP j, and may mean the same slot for the TRP i and the TRP j.

In such the manner, the time difference calculated by the terminal may be reported to the base station, so that a distance between the two TRPs is calculated. In order to estimate a propagation delay, the terminal should measure the time difference, but the conventional scheme is insufficient for this purpose. When the TRP i and the TRP j are the same TRP, that is, when a downlink reference signal from one TRP is received by the terminal at two or more timings (e.g., when the downlink reference signal is received through two or more paths), the terminal does not consider that the boundaries of the downlink slots (or, subframes or symbols) in which the downlink reference signal is received are two or more, and utilizes (e.g., averages) the reception results of the downlink reference signal to derive only one boundary of the downlink slot (or subframe or symbol), which is more accurate. Therefore, in order to derive two reception timings at which the downlink reference signal from the same TRP is received in the terminal, the base station may need to provide additional signaling to the terminal.

For the terminal i (or, the terminal group to which the terminal i belongs), the base station may transmit a downlink reference signal, so that the terminal i estimates a difference in reception timing at the terminal i.

Figure 18:
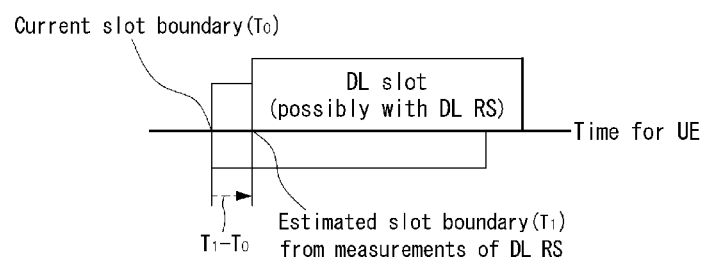
FIG. 18 is a conceptual diagram for describing a difference between boundaries of downlink slots derived from reception timings of a downlink reference signal.

FIG. 18 is a conceptual diagram for describing a difference between boundaries of downlink slots derived from reception timings of a downlink reference signal.

Method 9-1: A Difference Between a Boundary $T_0$ of a Downlink Slot Derived from a Previous Reception Timing of a Downlink Reference Signal from a TRP (or Base Station) and a Boundary $T_1$ of a Downlink Slot Derived from a New Reception Timing of the Downlink Reference Signal from the Same TRP (or Base Station) May be Measured.

Referring to FIG. 18, a boundary of a downlink slot that the terminal previously estimates (or has estimated) when receiving a downlink reference signal from a base station (or TRP) may be assumed to be $T_0$. The terminal may newly estimate a boundary of a downlink slot by receiving the downlink reference signal from the base station (or TRP), and the newly-estimated boundary may be assumed to be $T_1$. In this case, the terminal may derive $(T_1-T_0)$. For convenience of description, it can be expressed as measuring a RS time difference (RSTD) of the same TRP.

The terminal may assume the TRP (or base station) transmitting the downlink reference signal (i.e., downlink PRS, SS/PBCH block, or CSI-RS) used for previously deriving a downlink slot boundary to be the same as the TRP (or base station) transmitting the downlink reference signal used for newly deriving the downlink slot boundary. That is, the terminal may newly derive the boundary of the downlink slot even for the same TRP. Since this is performed for a single TRP, it is different from the conventional procedure for measuring a downlink RSTD. Even if the terminal newly derives the boundary of the downlink slot using the downlink reference signal, the terminal may not apply the newly derived boundary when receiving the downlink slot.

When the TRP shares the reference time T to the terminal i, the terminal i may compensate for the difference $(T_1-T_0)$ between the previously-derived downlink slot boundary and the newly-derived downlink slot boundary. Alternatively, the terminal may derive $T_1$ and $T_0$ respectively. In this case, since the terminal i already knows the downlink propagation delay $\Delta_i$ while managing the boundary of the downlink slot, a more accurate time may be obtained by further considering $(T_1-T_0)$. The terminal may not need to report the RSTD for the same TRP to the base station.

When the base station compensates for the propagation delay in advance and transmits it to the terminal, the RSTD for the same TRP may be required. When the terminal is configured to measure the downlink RSTD and report it to the base station, the terminal may measure the RSTD for the same TRP as well as the RSTD for different TRPs, and report them to the base station.

Method 9-2: When the Base Station Indicates (or Configures) the Terminal to Measure a Downlink RSTD by RRC Signaling, the Terminal May be Configured to Report the RSTD for the Reference TRP and the RSTD for Different TRPs Together.

Figure 19:
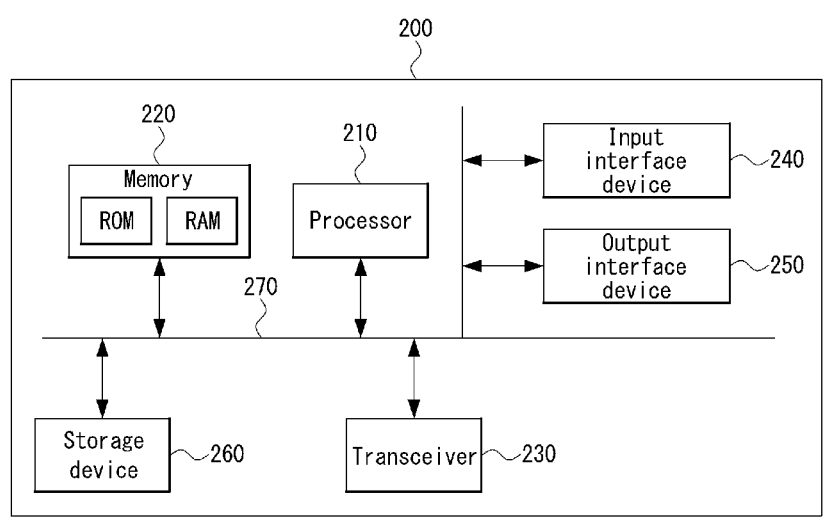
FIG. 19 is a block diagram illustrating a configuration of a communication node according to an exemplary embodiment of the present disclosure.

FIG. 19 is a block diagram illustrating a configuration of a communication node according to an exemplary embodiment of the present disclosure.

The communication node described with reference to FIG. 19 may be the terminal or the base station performing the methods according to the exemplary embodiments of the present disclosure. Referring to FIG. 19, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first terminal for synchronized operations according to time-sensitive networking, the operation method comprising:
receiving information on a reference time from a base station;
obtaining an offset of the first terminal with respect to the reference time or information for deriving the offset, and deriving the offset from the information for deriving the offset;
determining a timing at which uplink transmission is performed by reflecting the offset to the reference time; and
performing the uplink transmission at the determined timing,
wherein the offset is obtained through a scheme based on a timing advance (TA), or through a scheme based on a round-trip time (RTT) or a combination of a transmit and receive (Rx-Tx) time difference measured by the first terminal and an Rx-Tx time difference measured by the base station, and the Rx-Tx time difference is determined as a difference between a reception timing and a transmission timing at the first terminal or a difference between a reception timing and a transmission timing at the base station, and
wherein the RTT is measured by the first terminal based on a downlink reference signal of the base station and an uplink reference signal of the first terminal, or measured by the base station and transmitted from the base station to the first terminal.

2. The operation method according to claim 1, wherein the reference time is generated by a global reference clock of the base station and received from the base station, or is generated by a global reference clock of a second terminal other than the first terminal and received from the second terminal through the base station.

3. The operation method according to claim 2, wherein the reference time is commonly applied to a terminal group including the first terminal and the second terminal.

4. The operation method according to claim 1, wherein the TA is defined by a difference between a boundary of a downlink subframe received by the first terminal and a boundary of an uplink subframe transmitted by the first terminal, the uplink subframe having a same index as the downlink subframe.

5. The operation method according to claim 1, wherein the downlink reference signal is at least one of a downlink positioning reference signal (PRS), a synchronization signal (SS)/physical broadcast channel (PBCH) block, and a channel state information (CSI)-RS, and the uplink reference signal is at least one of an uplink PRS and a sounding reference signal (SRS).

6. The operation method according to claim 1, wherein when the RTT is measured by the first terminal, RTT measurement using the downlink reference signal is triggered by downlink control information (DCI), and the DCI further includes information indicating a resource of the downlink reference signal.

7. The operation method according to claim 6, wherein when the DCI allocates a downlink transport block (TB), the DCI further indicates whether rate matching is applied or not, the rate matching being for mapping a physical downlink shared channel (PDSCH) to resource elements (RE) to which the downlink reference signal is not mapped.

8. The operation method according to claim 1, wherein the offset of the first terminal or the information for deriving the offset is received from the base station through downlink control information (DCI) included in a terminal-specific physical downlink control channel (PDCCH) or a medium access control (MAC) random access response (RAR) or MAC control element (CE) included in a terminal group-specific PDSCH, or measured by the first terminal and reported to the base station through a terminal-specific uplink channel.

9. The operation method according to claim 8, wherein when the offset is obtained through a scheme based on a TA, the MAC RAR or the MAC CE includes an initial value of a TA or a timing advance command (TAC) that is a value accumulated in a current TA.

10. The operation method according to claim 9, wherein the MAC RAR or the MAC CE includes information on a unit time applied to the TA and/or the TAC.

11. An operation method of a base station for synchronized operations according to time-sensitive networking, the operation method comprising:
providing information on a reference time generated by a global reference clock to a first terminal;
obtaining an offset of the first terminal with respect to the reference time or information for deriving the offset, and providing the offset or the information for deriving the offset to the first terminal; and performing uplink reception for the first terminal, wherein the first terminal performs uplink transmission corresponding to the uplink reception at a timing determined by reflecting the offset to the reference time, wherein the offset is obtained through a scheme based on a timing advance (TA), or through a scheme based on a round-trip time (RTT) or a combination of a transmit and receive (Rx-Tx) time difference measured by the first terminal and an Rx-Tx time difference measured by the base station, and the Rx-Tx time difference is determined as a difference between a reception timing and a transmission timing at the first terminal or a difference between a reception timing and a transmission timing at the base station, and wherein the RTT is measured by the base station based on a downlink reference signal of the base station and an uplink reference signal of the first terminal, and transmitted from the base station to the first terminal.

12. The operation method according to claim 11, wherein the reference time is commonly applied to a terminal group including the first terminal and the second terminal.

13. The operation method according to claim 11, wherein the downlink reference signal is at least one of a downlink positioning reference signal (PRS), a synchronization signal (SS)/physical broadcast channel (PBCH) block, and a channel state information (CSI)-RS, and the uplink reference signal is at least one of an uplink PRS and a sounding reference signal (SRS).

14. The operation method according to claim 11, wherein the offset of the first terminal or the information for deriving the offset is provided to the first terminal through downlink control information (DCI) included in a terminal-specific physical downlink control channel (PDCCH) or a medium access control (MAC) random access response (RAR) or MAC control element (CE) included in a terminal group-specific PDSCH.

15. The operation method according to claim 14, wherein when the offset is obtained through a scheme based on a TA, the MAC RAR or the MAC CE includes an initial value of a TA or a timing advance command (TAC) that is a value accumulated in a current TA.

16. The operation method according to claim 15, wherein the MAC RAR or the MAC CE includes information on a unit time applied to the TA and/or the TAC.

* * * * *